(12) United States Patent
Tanaka

(10) Patent No.: US 7,643,759 B2
(45) Date of Patent: Jan. 5, 2010

(54) SIGNAL-QUALITY EVALUATION DEVICE, SIGNAL ADJUSTMENT METHOD, OPTICAL-SIGNAL EVALUATION SYSTEM, AND OPTICAL TRANSMISSION SYSTEM

(75) Inventor: Masato Tanaka, Yokohama (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 449 days.

(21) Appl. No.: 11/330,397

(22) Filed: Jan. 12, 2006

(65) Prior Publication Data
US 2006/0159451 A1 Jul. 20, 2006

(30) Foreign Application Priority Data
Jan. 12, 2005 (JP) ............................ 2005-005512

(51) Int. Cl.
G02B 6/00 (2006.01)
H03M 1/00 (2006.01)

(52) U.S. Cl. ............................ 398/177; 398/94; 398/33; 398/38; 385/5; 385/15; 385/16; 385/24; 385/32; 385/122; 375/317; 375/296; 375/297

(58) Field of Classification Search ............... 398/38, 398/26, 173–181, 209; 375/296, 297, 317; 385/5, 15, 16, 24, 32, 122
See application file for complete search history.

(56) References Cited

U.S. PATENT DOCUMENTS

| | | | | |
|---|---|---|---|---|
| 4,245,177 A | * | 1/1981 | Schmitz | 315/205 |
| 4,630,898 A | * | 12/1986 | Jewell | 359/243 |
| 5,142,203 A | * | 8/1992 | Oda et al. | 315/308 |
| 5,521,749 A | * | 5/1996 | Kawashima | 359/325 |
| 5,534,996 A | * | 7/1996 | Mori et al. | 356/218 |
| 5,844,936 A | * | 12/1998 | Lesthievent | 375/148 |
| 5,875,049 A | * | 2/1999 | Asano et al. | 398/202 |
| 6,268,945 B1 | * | 7/2001 | Roberts | 398/38 |
| 6,297,902 B1 | * | 10/2001 | Kosaka et al. | 359/337 |
| 6,344,924 B1 | * | 2/2002 | Suzuki et al. | 359/337.1 |
| 6,374,029 B1 | * | 4/2002 | Nakano et al. | 385/131 |
| 6,396,601 B1 | * | 5/2002 | Takara et al. | 398/9 |
| 6,424,773 B1 | * | 7/2002 | Watanabe | 385/122 |
| 6,453,082 B1 | * | 9/2002 | Watanabe | 385/15 |
| 6,473,210 B1 | * | 10/2002 | Evjenth et al. | 398/38 |

(Continued)

OTHER PUBLICATIONS

Shake et al., "Quality Monitoring of Optical Signals Influenced by Chromatic Dispersion in a Transmission Fiber Using Average Q-Factor Evaluation", IEEE Photonics Technology Letters, vol. 13, No. 4, pp. 385-387 (2001).

(Continued)

*Primary Examiner*—Ken N Vanderpuye
*Assistant Examiner*—Danny W. Leung
(74) *Attorney, Agent, or Firm*—McDermott Will & Emery LLP

(57) ABSTRACT

Provided are a signal-quality evaluation device and a signal adjustment method which require shorter evaluation time and which have high flexibility of application. A signal quality evaluation device 100 includes an optical component 110 and an optical output detector 120. In the optical component 110, an output optical power $P_{out}$ is a function of an input optical power $P_{in}$, and this function $P_{out}(P_{in})$ has at least one maximum point. The optical output detector 120 detects the time-average power of light output from the optical component 110.

7 Claims, 28 Drawing Sheets

U.S. PATENT DOCUMENTS

| | | | | |
|---|---|---|---|---|
| 6,507,731 | B1* | 1/2003 | Hasegawa | 455/115.3 |
| 6,583,910 | B1* | 6/2003 | Satoh | 398/182 |
| 6,665,480 | B2* | 12/2003 | Watanabe | 385/122 |
| 6,694,104 | B1* | 2/2004 | Caplan et al. | 398/197 |
| 6,751,413 | B2* | 6/2004 | Hill et al. | 398/14 |
| 6,842,410 | B1* | 1/2005 | Spielman et al. | 369/47.27 |
| 6,928,243 | B2* | 8/2005 | Youn et al. | 398/33 |
| 7,024,111 | B2* | 4/2006 | Knox et al. | 398/25 |
| 7,061,668 | B2* | 6/2006 | Maurer et al. | 359/341.41 |
| 7,072,549 | B2* | 7/2006 | Watanabe | 385/122 |
| 7,072,589 | B2* | 7/2006 | Joergensen | 398/175 |
| 7,206,522 | B2* | 4/2007 | Garcia et al. | 398/206 |
| 7,215,464 | B1* | 5/2007 | Komaki et al. | 359/341.44 |
| 7,218,686 | B2* | 5/2007 | Matsumoto et al. | 375/317 |
| 7,224,906 | B2* | 5/2007 | Cho et al. | 398/183 |
| 7,248,804 | B2* | 7/2007 | Maeda et al. | 398/180 |
| 7,263,262 | B1* | 8/2007 | Covey | 385/122 |
| 7,280,766 | B2* | 10/2007 | Watanabe | 398/180 |
| 7,324,758 | B2* | 1/2008 | Marutani et al. | 398/147 |
| 7,369,779 | B1* | 5/2008 | Croussore et al. | 398/176 |
| 7,389,045 | B2* | 6/2008 | Fee | 398/33 |
| 7,423,564 | B2* | 9/2008 | Kitayama et al. | 341/137 |
| 7,460,793 | B2* | 12/2008 | Taylor | 398/208 |
| 7,463,804 | B2* | 12/2008 | Covey | 385/122 |
| 2003/0063860 | A1* | 4/2003 | Watanabe | 385/39 |
| 2004/0017603 | A1* | 1/2004 | Jay et al. | 359/341.4 |
| 2004/0061929 | A1* | 4/2004 | Lelic | 359/341.1 |
| 2004/0223759 | A1* | 11/2004 | Fee | 398/33 |
| 2005/0141249 | A1* | 6/2005 | Huang | 363/72 |
| 2005/0147370 | A1* | 7/2005 | Yusoff et al. | 385/125 |
| 2005/0208905 | A1* | 9/2005 | Numanami et al. | 455/114.3 |
| 2005/0213990 | A1* | 9/2005 | Watanabe | 398/177 |
| 2006/0159451 | A1* | 7/2006 | Tanaka | 398/38 |
| 2008/0205834 | A1* | 8/2008 | Covey | 385/122 |
| 2008/0225362 | A1* | 9/2008 | Covey | 359/108 |
| 2008/0273026 | A1* | 11/2008 | Nishinosono | 345/212 |
| 2008/0273831 | A1* | 11/2008 | Bogoni et al. | 385/14 |
| 2009/0060528 | A1* | 3/2009 | Takashima et al. | 398/186 |

OTHER PUBLICATIONS

Takushima et al., "Experimental Demonstration of In-Service Dispersion Monitoring in 960-km WDM Transmission System Using Optical Frequency-Modulation Method", IEEE Photonics Technology Letters, vol. 16, No. 6, pp. 870-872 (2003).

Park et al., "Performance Comparisons of Chromatic Dispersion-Monitoring Techniques Using Pilot Tones", IEEE Photonics Technology Letters, vol. 16, No. 6, pp. 873-875 (2003).

Westbrook et al., "Measurement of Residual Chromatic Dispersion of a 40-Gb/s RZ Signal via Spectral Broadening", IEEE Photonics Technology Letters, vol. 14, No. 3, pp. 346-348 (2001).

Pan et al., Technical Digest, OFC2001 WH5 (2001).

* cited by examiner

SIGNAL-QUALITY EVALUATION DEVICE, SIGNAL ADJUSTMENT METHOD, OPTICAL-SIGNAL EVALUATION SYSTEM, AND OPTICAL TRANSMISSION SYSTEM

BACKGROUND OF THE INVENTION

1. Field of the Invention

The present invention relates to a signal-quality evaluation device for evaluating the quality of optical signals, a signal adjustment method, and an optical-signal evaluation system and an optical transmission system which are equipped with such signal-quality evaluation device.

2. Description of the Related Art

In a future optical transmission system, an optimal condition for transmitting optical signals will tend to change according to the system structure that becomes more complicated due to an increase in transmission capacity. Therefore, adjustment means (e.g. dispersion compensation means) for constantly optimizing the transmission condition is necessary. Furthermore, in order to utilize such adjustment means effectively, a device that evaluates and monitors the quality of an optical signal is also necessary.

In order to evaluate the quality of an optical signal, a certain parameter must be extracted from the optical signal being transmitted. A typical example of this parameter is a bit error rate (BER). The bit error ratio is a ratio of error in which an optical signal is recognized as level 1 when the actual level is level 0 or recognized as level 0 when the actual level is level 1, such error being caused by noise or waveform distortion of the optical signal due to the transmission thereof. Since a BER is directly related to the quality of an optical signal, it is reliable as a parameter to be used for an evaluation. Actually, there is an example in which a BER is used as a reference for implementing dynamical adjustment in variable dispersion compensators. However, determining a BER requires a long period of time for measurement, and especially if the BER is small, the time required for measurement is even longer.

A parameter that is known as similar to a BER is a Q-factor (I. Shake, et al., IEEE Photonics Technology Letters, Vol. 13, No. 4, pp. 385 to 387 (2001)). The Q-factor also requires time for determining the amplitude distributions of optical signals, that is, the time required for evaluation is long.

Furthermore, the quality of an optical signal can also be evaluated by detecting cumulative dispersion (Y. Takushima, et al., IEEE Photonics Technology Letters, Vol. 15, No. 6, pp. 870 to 872 (2003), and K. J. Park, et al., IEEE Photonics Technology Letters, Vol. 15, No. 6, pp. 873 to 875 (2003)). According to this method, when an optical signal is to be transmitted, the optical signal is subject to frequency modulation or slight intensity modulation. The modulated component is then extracted at a receiving side. Based on the detection result of the modulated component, the cumulative dispersion of the optical signal is determined. Thus, the quality of the optical signal is evaluated on the basis of the cumulative dispersion. In this method, however, since the optical signal must be processed at a transmitting side, it is difficult to apply this method to an optical network that has a plurality of transmitting sides and a plurality of receiving sides. Moreover, subjecting an optical signal to such a processing could also cause waveform distortion.

A method of monitoring the quality of an optical signal by evaluating the distortion itself of an optical signal is also known (P. S. Westbrook, et. al., IEEE Photonics Technology Letters, Vol. 14, No. 3, pp. 346 to 348 (2002), and Z. Pan, et al., OFC2001 WH5). According to this method, a clock frequency component of an optical signal is extracted at a receiving side, and the quality of the optical signal is evaluated based on this extraction result. Alternatively, according to the principle that the degree of spectral broadening depends upon an optical-signal pulse width, the quality of an optical signal is evaluated by measuring the degree of spectral broadening caused by self-phase modulation to which an optical signal is subjected. Although these methods are advantageous in that the optical signal need not be processed at a transmitting side, these methods are inferior in the flexibility of application in terms of signal format of optical signals: specifically, the method of Westbrook, et al. is not applicable to CSRZ signal format, and the method of Pan, et al. is not applicable to NRZ signal format.

SUMMARY OF THE INVENTION

It is an object of the present invention to provide a signal-quality evaluation device and a signal adjustment method in which the time required for evaluating the quality of optical signals can be shortened and which are superior in applicability in terms of network configuration and signal format. Another object of the present invention is to provide an optical-signal evaluation system and an optical transmission system which are equipped with such signal-quality evaluation device.

To achieve such objects, a signal-quality evaluation device according to the present invention comprises a converter in which an output power $P_{out}$ has at least one maximum point with respect to an input power $P_{in}$ of a digital signal pulse and an output detector which detects an average output power corresponding to a plurality of output pulses converted from the digital signal by the converter and outputs output-power information.

Another aspect of the present invention is to provide a signal adjustment method which comprises the steps of inputting digital signals to be evaluated into a converter in which an output power $P_{out}$ has at least one maximum point with respect to an input power $P_{in}$, the digital signals having pulses whose maximum power is greater than an input power at the maximum point; detecting, with an output detector, an average output power corresponding to a plurality of output pulses converted from the digital signals by the converter; and adjusting the quality of the digital signals based on the output information of the output power.

Furthermore, another aspect of the present invention is to provide an optical-signal evaluation system which comprises a signal-quality evaluation device of the present invention and an amplifier that is disposed between the optical transmission line and the signal-quality evaluation device and that amplifies digital signals, wherein the amplifier outputs digital signals having pulses whose maximum power is greater than an input power level at the maximum point.

Furthermore, another aspect of the present invention is to provide an optical transmission system for transmitting optical signals through an optical transmission line, wherein an optical-signal evaluation system of the present invention is disposed at an intermediate position on the optical transmission line.

BRIEF DESCRIPTION OF THE DRAWINGS

The present invention will be described below with reference to the drawings. The drawings are provided for illustrative purposes, and therefore, will not limit the scope of the invention.

FIG. 2A shows an optical signal having no waveform distortion, FIG. 2B showing a waveform of an output light beam when the optical signal is input to the optical component;

FIG. 3A shows an optical signal having waveform distortion, FIG. 3B showing a waveform of an output light beam when the optical signal is input to the optical component.

FIGS. 11A and 11B show a case of a return-to-zero (RZ) signal format with a cumulative dispersion of 0 ps/nm;

FIGS. 12A and 12B shows a case of an RZ signal format with a cumulative dispersion of 40 ps/nm;

FIGS. 13A and 13B shows a case of a carrier-suppressed-return-to-zero (CSRZ) signal format with a cumulative dispersion of 0 ps/nm; and FIGS. 14A and 14B shows a case of a CSRZ signal format with a cumulative dispersion of 60 ps/nm.

DESCRIPTION OF THE PREFERRED EMBODIMENTS

Figure 1A:
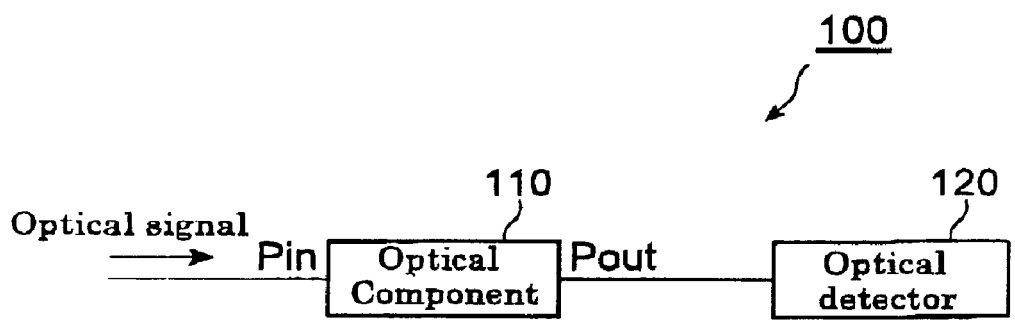
FIG. 1A is a block diagram illustrating a configuration of a signal-quality evaluation device according to an embodiment of the present invention.
Figure 1B:
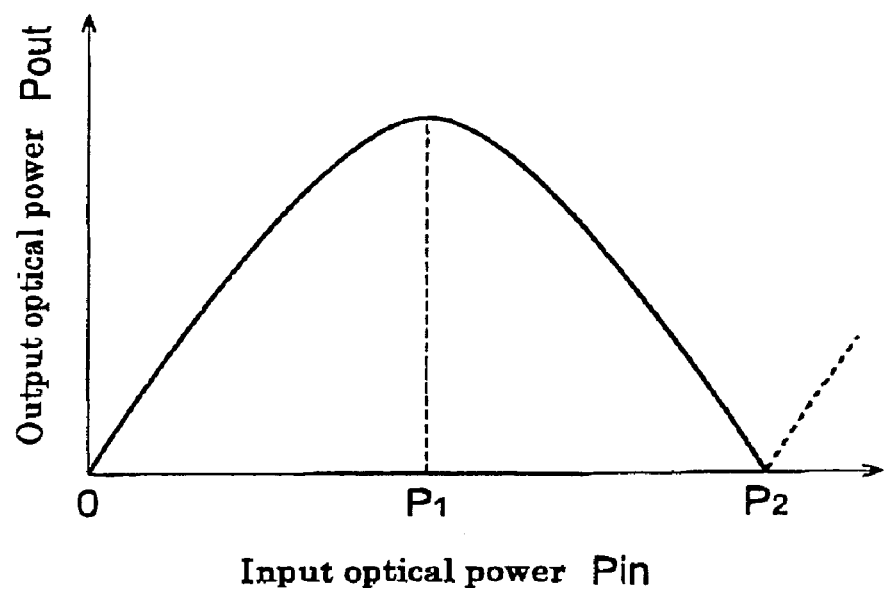
FIG. 1B is a graph illustrating input-output characteristics of an optical component included in the signal-quality evaluation device.

A principle of optical-signal evaluation in a signal-quality evaluation device and a signal adjustment method according to embodiments of the present invention will be described first. FIG. 1A is a block diagram of a signal-quality evaluation device 100 according to an embodiment of the present invention. FIG. 1B is a graph illustrating input-output characteristics of an optical component 110 included in the signal-quality evaluation device 100.

The signal-quality evaluation device 100 has an optical output detector 120 and the optical component 110 functioning as a converter. The optical component 110 outputs input light by reflecting or transmitting it, and as shown in FIG. 1B, an output optical power $P_{out}$ is a function of an input optical power $P_{in}$, the function $P_{out}(P_{in})$ having at least one maximum point. The function $P_{out}(P_{in})$ may have a plurality of maximum points. The optical output detector 120 detects the time-average power of the light output from the optical component 110, and includes, for example, a photodiode.

The input optical power $P_{in}$ preferably has, within a range in which the input optical power $P_{in}$ is greater than a predetermined value, at least one nonzero point at which the output optical power $P_{out}$ of the optical component 110 is zero. Furthermore, it is also preferable that a differential coefficient of the function $P_{out}(P_{in})$ is large. In these cases, the sensitivity for evaluating the quality of an optical signal is high.

According to the input-output characteristics of the optical component 110 shown in FIG. 1B, the output optical power $P_{out}$ becomes zero when the input optical power $P_{in}$ is zero; the output optical power $P_{out}$ becomes maximum when the input optical power $P_{in}$ is $P_1$; and the output optical power $P_{out}$ becomes zero when the input optical power $P_{in}$ is $P_2$ ($>P_1$). If the input optical power $P_{in}$ is within a range between zero and $P_1$, the output optical power $P_{out}$ increases as the input optical power $P_{in}$ increases. On the other hand, if the input optical power $P_{in}$ is within a range between $P_1$ and $P_2$, the output optical power $P_{out}$ decreases as the input optical power $P_{in}$ increases.

The power of 1-level of an optical signal input to the optical component 110 is set to a power level within the range exceeding $P_1$ but not exceeding $P_2$, and more preferably, it is set to $P_2$.

Figure 2A:
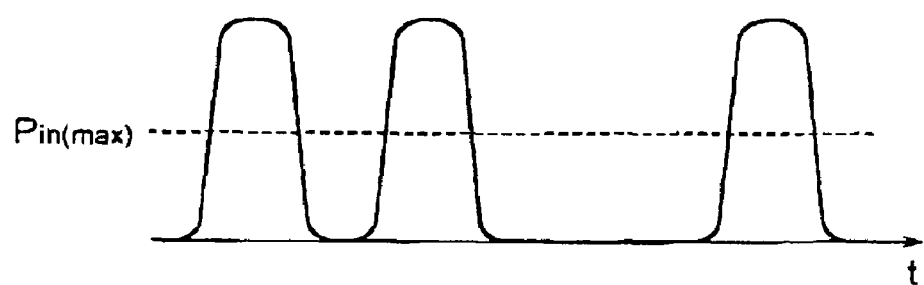
FIGS. 2A, 2B, 3A, and 3B are figures for illustrating the principle of an optical-signal evaluation in the signal-quality evaluation device and a signal adjustment method according to embodiments of the present invention.
Figure 2B:
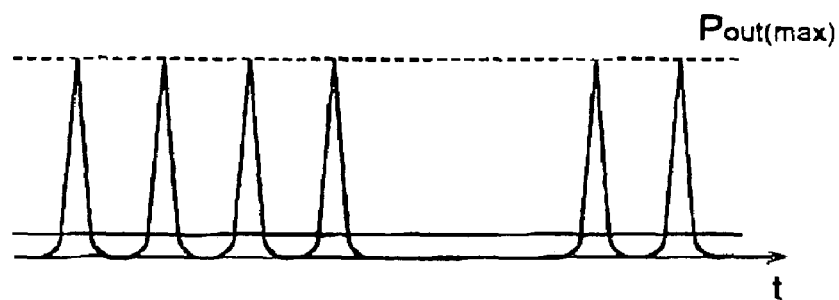
Figure 3A:
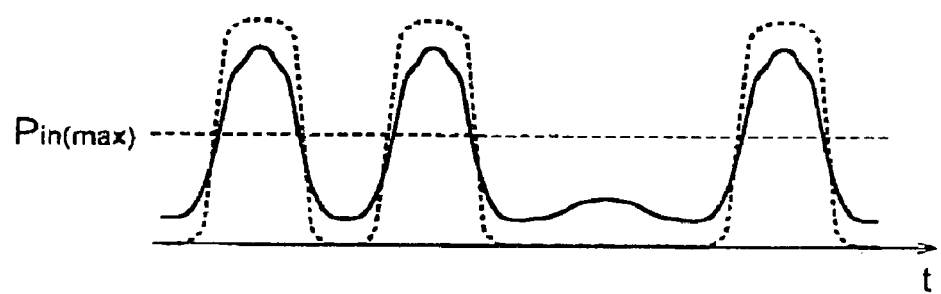
Figure 3B:
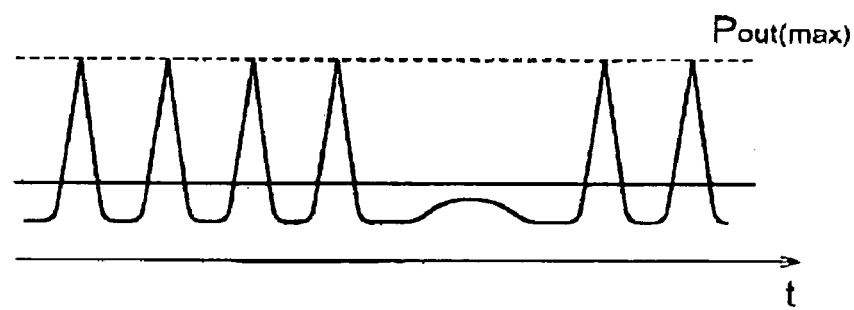

FIGS. 2A, 2B, 3A, and 3B are figures for illustrating the principle of optical-signal evaluation in the signal-quality evaluation device and the signal adjustment method according to the embodiments of the present invention: FIG. 2A shows an optical signal having no waveform distortion, and FIG. 2B shows a waveform of an output light beam in a case where the optical signal is input to the optical component 110. FIG. 3A shows an optical signal having waveform distortion, and FIG. 3B shows a waveform of an output light beam when the optical signal is input to the optical component 110. An input optical power $P_{in(max)}$ corresponding to a maximum value $P_{out(max)}$ of the output optical power $P_{out}$ of the optical component 110 is between a 0-level and 1-level of an input light beam $P_{in}$ of the optical component 110.

In a case where an optical signal which has no waveform distortion and whose waveform is clearly distinguishable in terms of 0-level and 1-level (FIG. 2A) enters the optical component 110, the output optical power $P_{out}$ becomes 0-level when the input optical power $P_{in}$ is 0-level or 1-level ($P_2$), whereas the output optical power $P_{out}$ becomes a maximum value when the input optical power $P_{in}$ is an intermediate value ($P_1$) between the 0-level and 1-level, as shown in FIG. 2B. In contrast, in a case where an optical signal having waveform distortion and whose waveform is not clearly distinguishable in terms of 0-level or 1-level (FIG. 3A) enters the optical component 110, the level of the output optical power $P_{out}$ increases as shown in FIG. 3B when the input optical power $P_{in}$ is 0-level or 1-level, since the 0-level of the input optical power $P_{in}$ is increased and the 1-level of the input optical power $P_{in}$ is decreased. However, as in the case where there is no waveform distortion, the output optical power $P_{out}$ becomes a maximum value $P_{out(max)}$ when the input optical power $P_{in}$ is $P_{in(max)}$.

Accordingly, when the time-average power of light output from the optical component 110 is detected by the optical output detector 120, the values detected by the optical output detector 120 (indicated by a solid line in FIG. 3B) in the case of an optical signal having waveform distortion is greater than the values detected by the optical output detector 120 (indicated by a solid line in FIG. 2B) in the case of a digital optical signal having no waveform distortion. The more inferior the quality of an optical signal, the greater the value detected by the optical output detector 120. In other words, the quality of an optical signal can be evaluated on the basis of the result of detection by the optical output detector 120.

Thus, with the signal-quality evaluation device and the signal adjustment method according to the embodiments of the present invention, it is possible to evaluate digital optical signals within a short time since an evaluation of an optical signal can be made on the basis of an optical-power value detected by the optical output detector 120. Moreover, the signal-quality evaluation device and the signal adjustment method of the present invention is superior in flexibility with respect to applicability to network configuration and signal format because the quality of an optical signal can be evaluated not only regardless of the type of a signal format but also by simply providing a signal-quality evaluation device 100 at a location where the evaluation is to be implemented, and without a need of processing the optical signal at a transmitting side.

Figure 4:
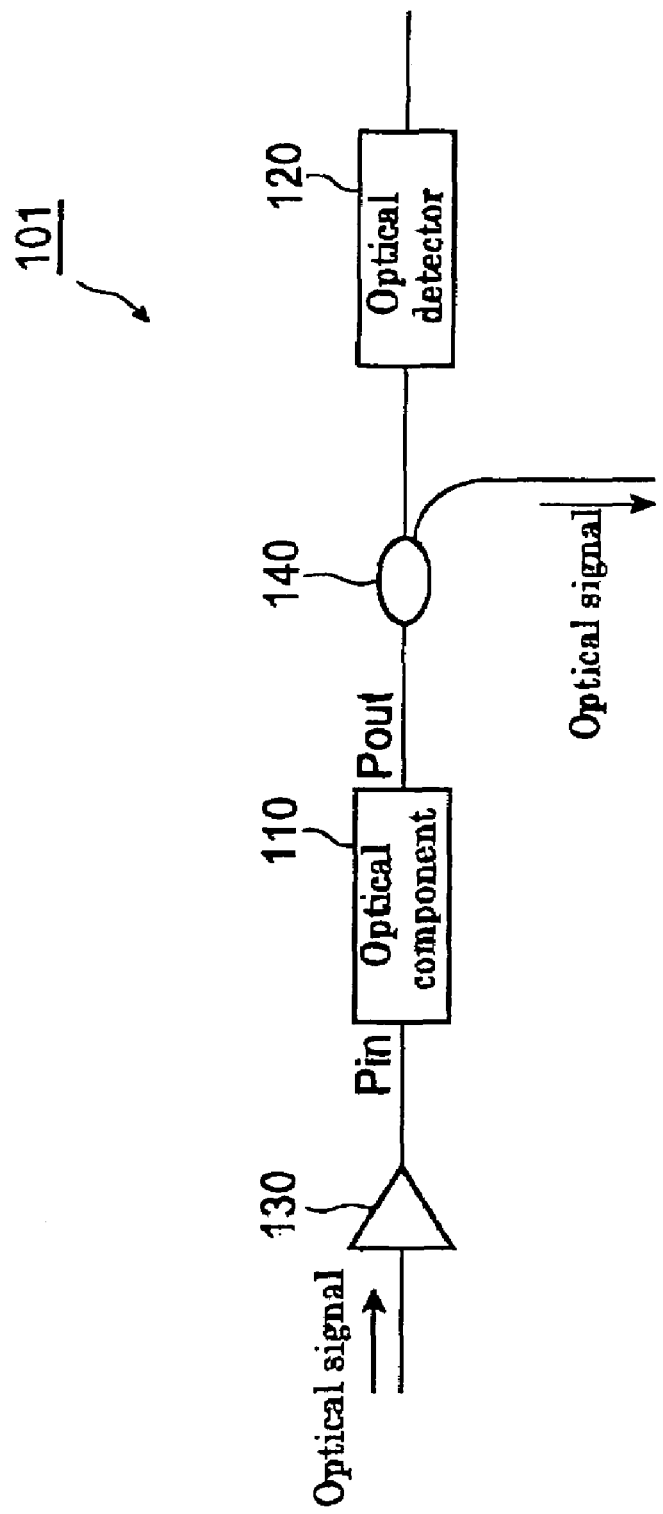
FIG. 4 is a block diagram illustrating a configuration of a signal-quality evaluation device, which is an example of modified embodiment of the present invention.

FIG. 4 is a block diagram showing the configuration of a signal-quality evaluation device 101, which is an example of modified embodiment of the present invention, and FIGS. 5A, 5B, 6A, and 6B illustrate shaping of signal waveforms. In the signal-quality evaluation device 101, in addition to the signal-quality evaluation device 100 shown in FIG. 1A, an optical amplifier 130 is provided at a position of prior stage relative to the optical component 110, and an optical splitter 140 is disposed between the optical component 110 and the optical output detector 120.

Figure 5A:
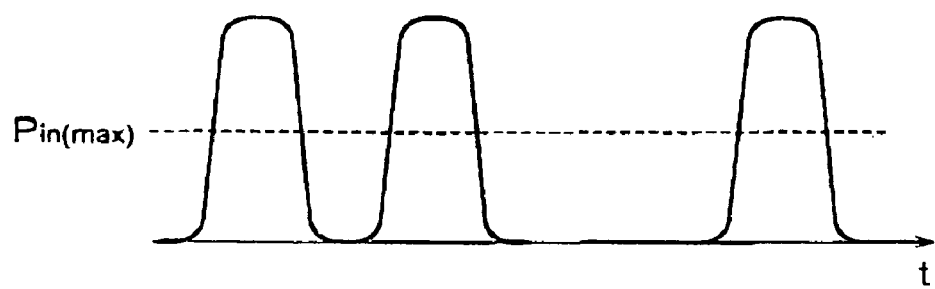
FIGS. 5A, 5B, 6A, and 6B are figures for illustrating shaping of signal waveforms.
Figure 5B:
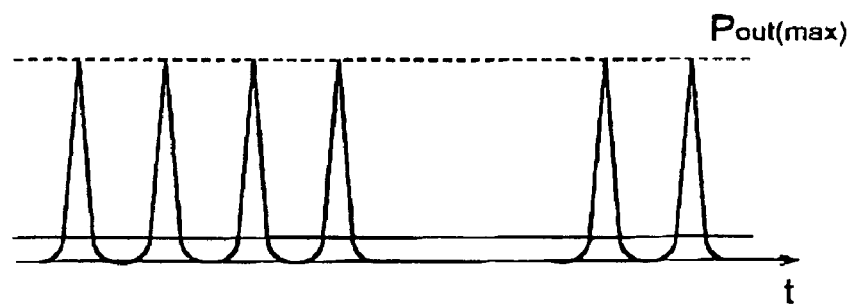
Figure 6A:
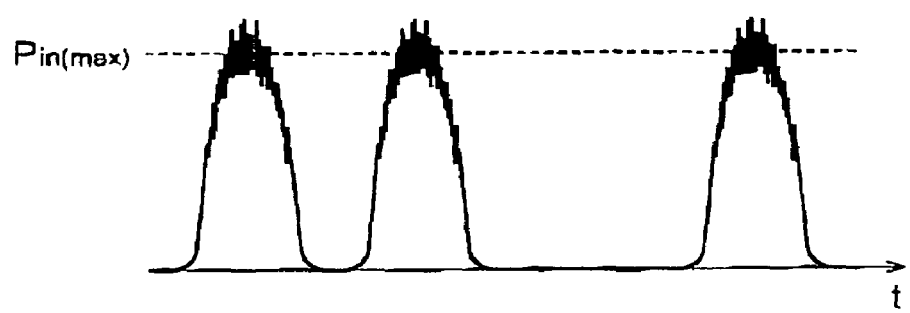
Figure 6B:
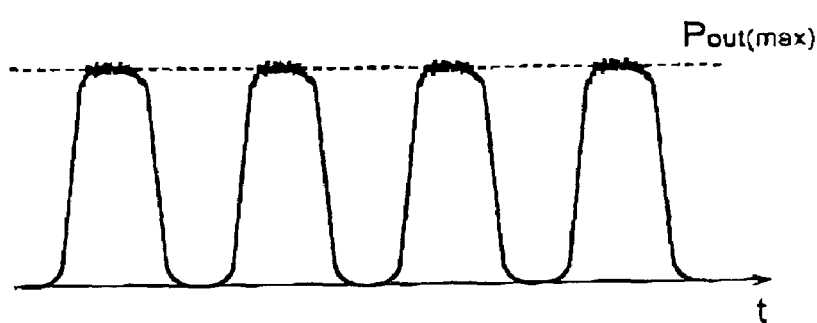

The quality of light to be input to the optical component 110 can be monitored as shown in FIG. 5B if a light beam $P_{in}$ is adjusted by the optical amplifier 130 such that the input optical power $P_{in(max)}$ corresponding to the maximum value $P_{out(max)}$ of the output optical power $P_{out}$ of the optical component 110 is between the 0-level and 1-level of the input light beam $P_{in}$ (FIG. 5A). On the other hand, in the case where the input light beam $P_{in}$ is adjusted by the optical amplifier 130 such that the input optical power $P_{in(max)}$ corresponding to the maximum value $P_{out(max)}$ of the output optical power $P_{out}$ of the optical component 110 substantially accords with the 1-level of the input light beam $P_{in}$ (FIG. 6A), the waveform shaping is accomplished as shown in FIG. 6B as a result of the level fluctuation near the 1-level of light to be split by and output from the optical splitter 140 being compacted by the optical component 110.

Figure 7:
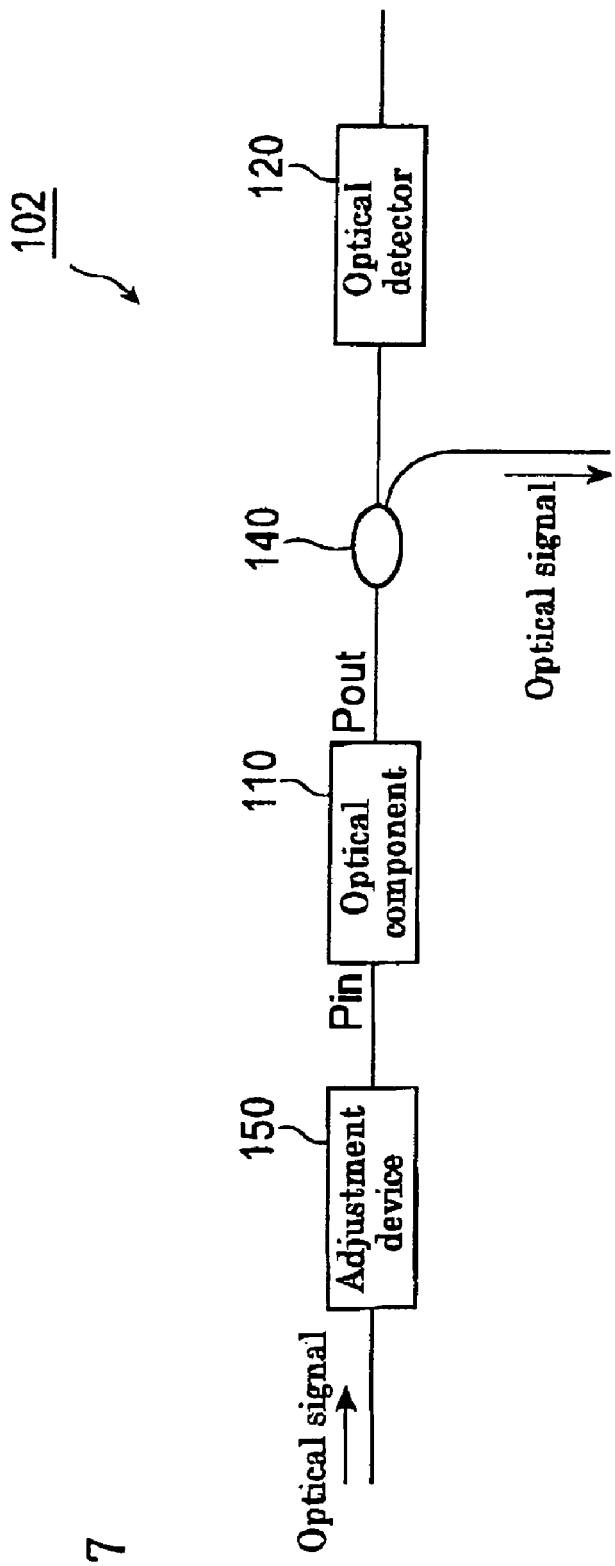
FIG. 7 is a block diagram illustrating a configuration of a signal-quality evaluation device according to another modification example of the embodiment of the present invention.
Figure 8:
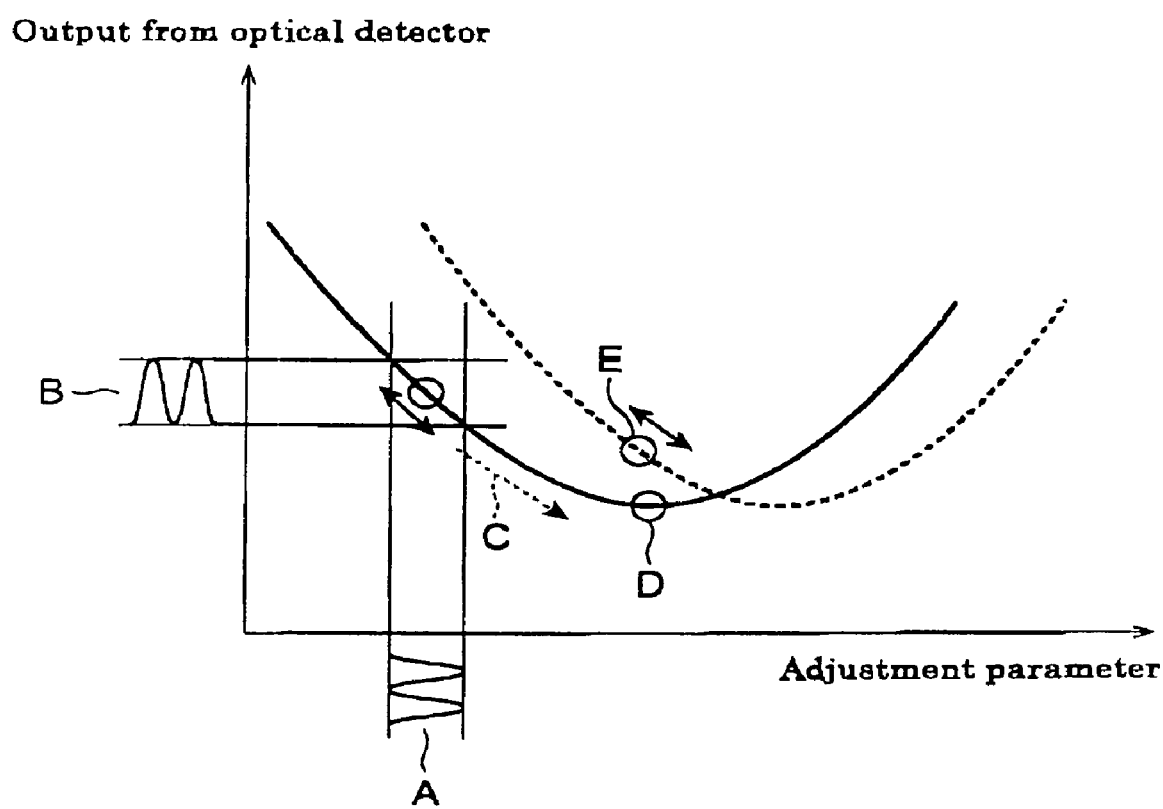
FIG. 8 illustrates signal-quality adjustment.

FIG. 7 is a block diagram of a signal-quality evaluation device 102 according to another modification example of the embodiment of the present invention. FIG. 8 illustrates signal-quality adjustment. The signal-quality evaluation device 102 is provided, in addition to the signal-quality evaluation device 100 shown in FIG. 1A, with a quality adjuster 150 disposed at a position of prior stage relative to the optical component 110, and the optical splitter 140 disposed between the optical component 110 and the optical output detector 120.

The quality adjuster 150 adjusts the quality of an input light beam on the basis of an output from the optical output detector 120, and outputs the adjusted light beam towards the optical component 110. For example, in a case where an adjustment parameter of the quality adjuster 150 and the output from the optical output detector 120 exhibit the relationship shown with a solid line in FIG. 8, the adjustment parameter is finely adjusted by increasing or decreasing to an extent that it does not affect the quality of an optical signal (A); the increase and decrease of the output from the optical output detector 120 is observed (B); and the adjustment parameter is finely adjusted in a direction in which the output decreases (C). This process is repeated until the output of the quality adjuster reaches an optimal point (D).

If the relationship between the adjustment parameter and the output from the optical output detector 120 is displaced from the solid line to a dotted line due to an external factor, the output from the optical output detector 120 is intensified. Therefore, the adjustment process is performed again. In a case where the optimal point fluctuates at every moment as in polarization mode dispersion, the adjustment parameter may be changed at a constant frequency f (on the order of kHz), and only a component of the frequency f may be detected from the output from the converter so that a feedback operation may be implemented continually so as to make the component to be minimal.

Figure 9:
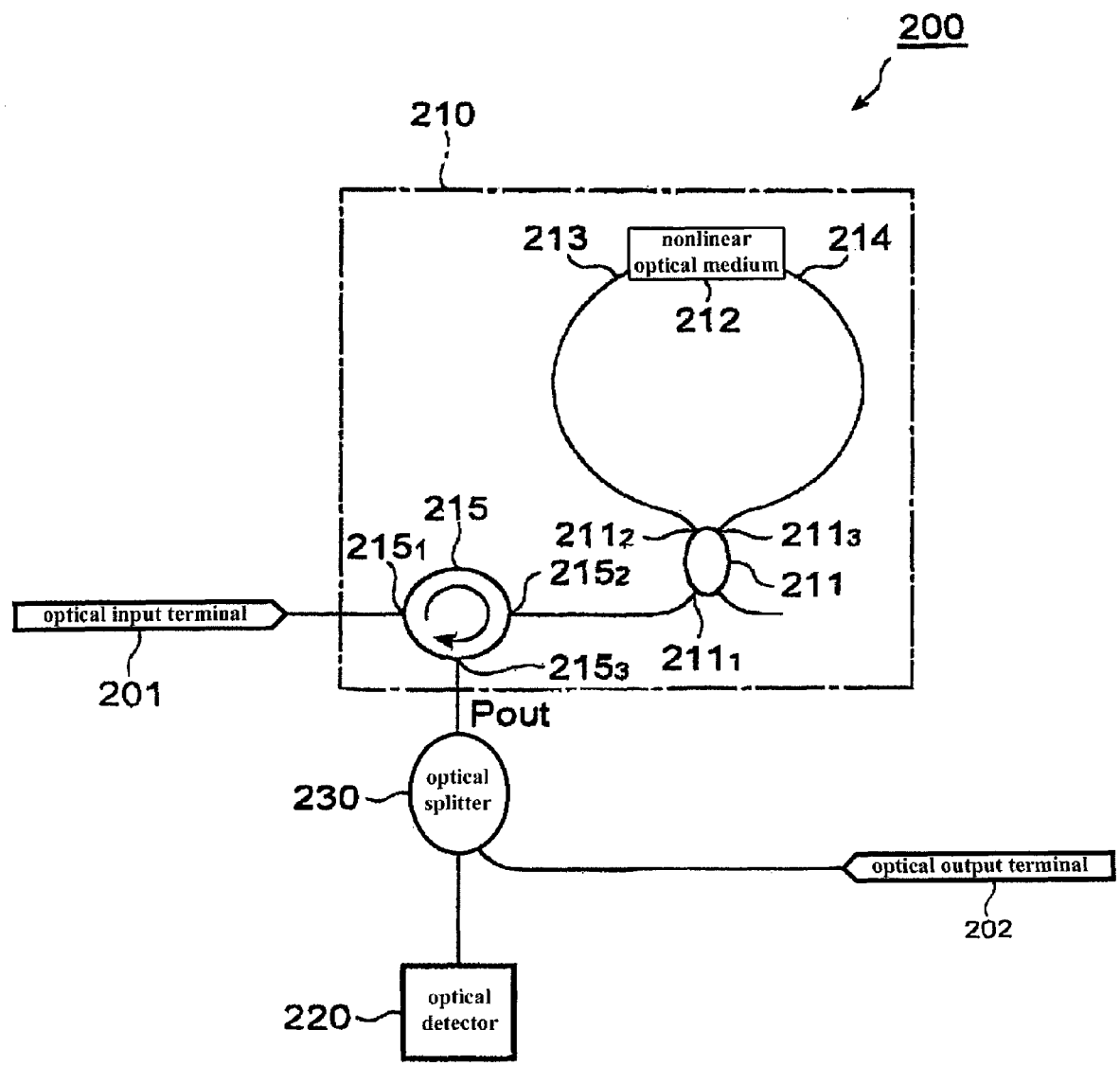
FIG. 9 schematically illustrates a signal-quality evaluation device 200 according to a specific example of the present invention.

The signal-quality evaluation device and the signal adjustment method will now be described in detail. FIG. 9 schematically illustrates a signal-quality evaluation device 200 according to a specific example of the present invention. The signal-quality evaluation device 200 includes an optical input terminal 201; an optical output terminal 202; an optical component 210; an optical detector 220; and an optical splitter 230. In the optical component 210, the output optical power $P_{out}$ is a function of the input optical power $P_{in}$, and this function $P_{out}(P_{in})$ has at least one maximum point. The optical detector 220 detects the time-average power of light output from the optical component 210.

The optical component 210 includes an optical coupler 211; a nonlinear optical medium 212; optical fibers 213, 214; and an optical circulator 215. The optical coupler 211 includes a first terminal $211_1$, a second terminal $211_2$, and a third terminal $211_3$. The optical coupler 211 receives light through the first terminal $211_1$, and splits the light so as to output the split light beams from the second terminal $211_2$ and the third terminal $211_3$. Moreover, the optical coupler 211 also receives light through the second terminal $211_2$ and the third terminal $211_3$ and outputs the light from the first terminal $211_1$. The nonlinear optical medium 212 is optically connected to the second terminal $211_2$ of the optical coupler 211 via the optical fiber 213, and is also optically connected to the third terminal $211_3$ of the optical coupler 211 via the optical fiber 214. The nonlinear optical medium 212 has an optical nonlinear effect. The nonlinear optical medium 212 is disposed on an optical path extending between the second terminal $211_2$ and the third terminal $211_3$ of the optical coupler 211. For example, a highly nonlinear optical fiber may be used as the nonlinear optical medium 212.

The optical circulator 215 includes a first terminal $215_1$, a second terminal $215_2$, and a third terminal $215_3$. The first terminal $215_1$, is connected to the optical input terminal 201, and the second terminal $215_2$ is connected to the first terminal $211_1$ of the optical coupler 211. The optical circulator 215 receives light through the first terminal $215_1$ and outputs the light from the second terminal $215_2$, and moreover, receives light through the second terminal $215_2$ and outputs the light from the third terminal $215_3$. The optical splitter 230 receives the light output from the third terminal $215_3$ of the optical circulator 215, splits the light, and then outputs the split light beams to the optical detector 220 and the optical output terminal 202.

In the optical coupler 211, if the splitting ratio (1−f):1 of light split from the first terminal $211_1$ to the second terminal $211_2$ and the third terminal $211_3$ is not equal to 1:1, the power $(1-f)P_{in}$ of light entering the nonlinear optical medium 212 through the optical fiber 213 is different from the power $fP_{in}$ of light entering the nonlinear optical medium 212 through the optical fiber 214. This results in a difference in phase rotation amount of self-phase modulation produced in the nonlinear optical medium 212. Such a difference in phase rotation amount is dependent on the input optical power $P_{in}$. Assuming that there is no loss, the power $P_{out}$ of light returning to the first terminal $211_1$ of the optical coupler 211 from the nonlinear optical medium 212 is zero when the difference in phase rotation amount is π.

In detail, assuming that the nonlinear optical medium 212 is a highly nonlinear optical fiber, the reflectivity $R(P_{in})$ is expressed with Eq. (1):

$$R(P_{in})=2f(1-2f)\exp(-\alpha L)[1+\cos\{\gamma(1-2f)P_{in}L_{eff}\}] \quad (1)$$

where the length of the optical fiber is represented as L, a nonlinear optical coefficient is represented as γ, and a loss is represented as α. The output optical power $P_{out}$ is expressed with Eq. (2):

$$P_{out}=P_{in}R(P_{in}) \quad (2),$$

where $L_{eff}$ is the effective length of the optical fiber expressed with Eq. (3):

$$L_{eff}=1-\exp(-\alpha L)/\alpha \quad (3).$$

It is apparent from Eq. (1) and Eq. (2) that the output optical power $P_{out}$ is zero not only when the input optical power $P_{in}$ is zero, but also when the input optical power $P_{in}$ is a value $P_2$ determined from Eq. (4):

$$P_2=\pi/\gamma(1-2f)L_{eff} \quad (4).$$

FIGS. 10, 11A, 11B, 12A, 12B, 13A, 13B, 14A, 14B illustrate operational simulation results of the signal-quality evaluation device 200 based on Eq. (1). Here, f is 0.1, L is 5.7 km, γ is 14 $W^{-1}km^{-1}$, and α is 0.58 dB/km. Moreover, the signal formats of optical signals include return-to-zero (RZ) and carrier-suppressed-return-to-zero (CSRZ) signal formats.

Figure 10:
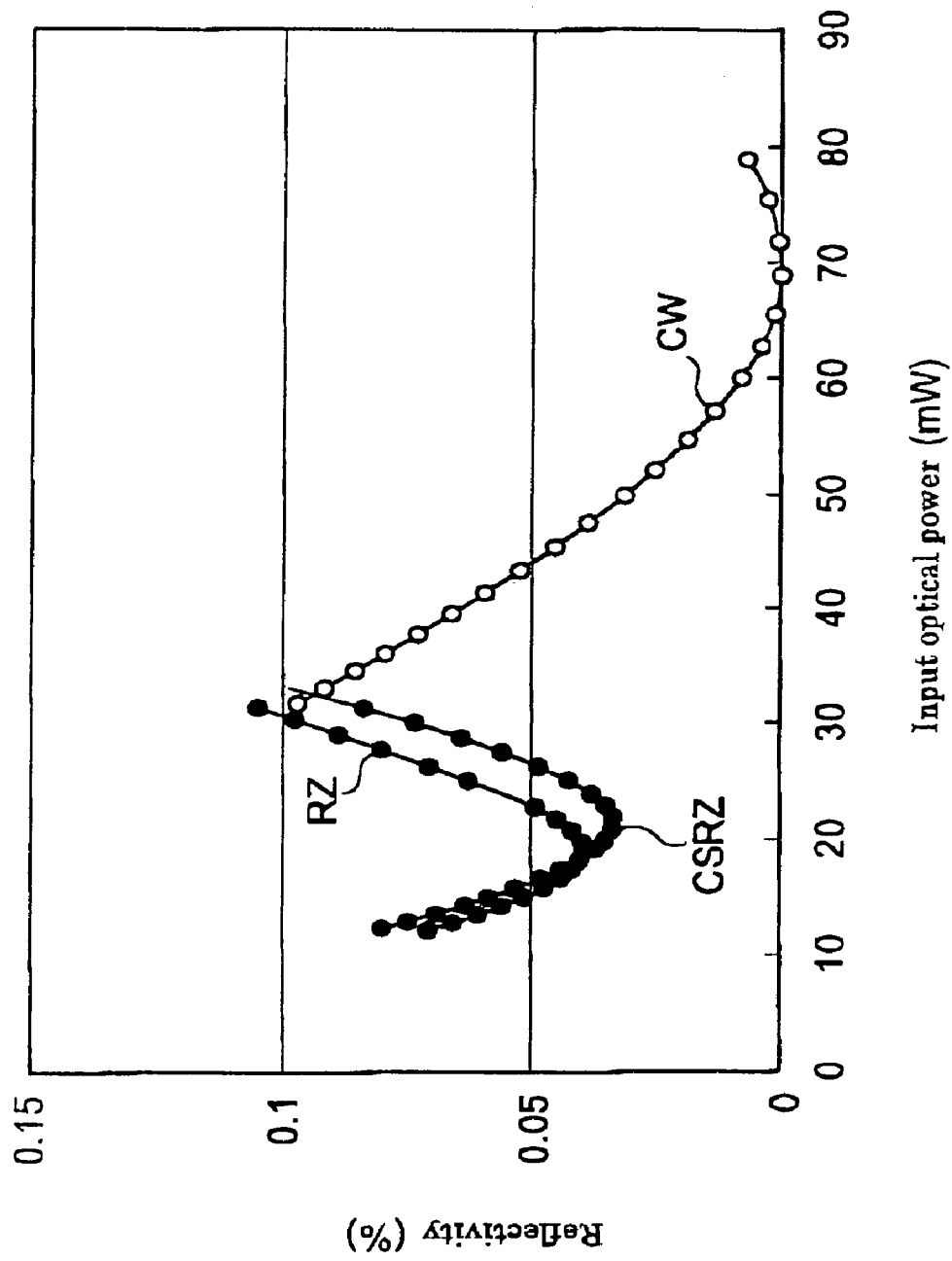
FIG. 10 is a graph that shows simulation results of a relationship between an input optical power $P_{in}$ and a reflectivity R in the signal-quality evaluation device 200.

FIG. 10 is a graph that shows simulation results of a relationship between the input optical power $P_{in}$ and the reflectivity R in the signal-quality evaluation device 200. As can be seen from FIG. 10, regarding the dependency of the reflectivity upon the input optical power, the reflectivity becomes minimum at a certain input power (≠0) if the turning point of output-light waveform is optimized. Therefore, for each signal format, the 1-level of input signal light is set such that the minimum value of reflectivity is near this minimum point. This setting method allows the adjustment of signals to easily be made.

Figure 11A:
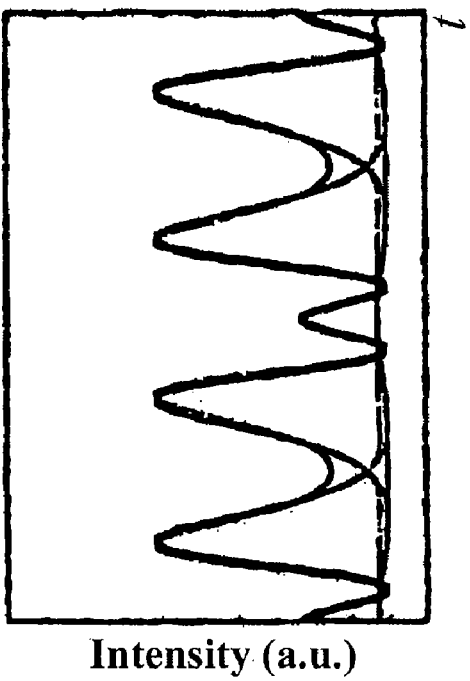
FIGS. 11A, 11B, 12A, 12B, 13A, 13B, 14A, and 14B are graphs for showing simulation results of an optical waveform of an optical signal and an optical waveform of output light in the signal-quality evaluation device 200.
Figure 11B:
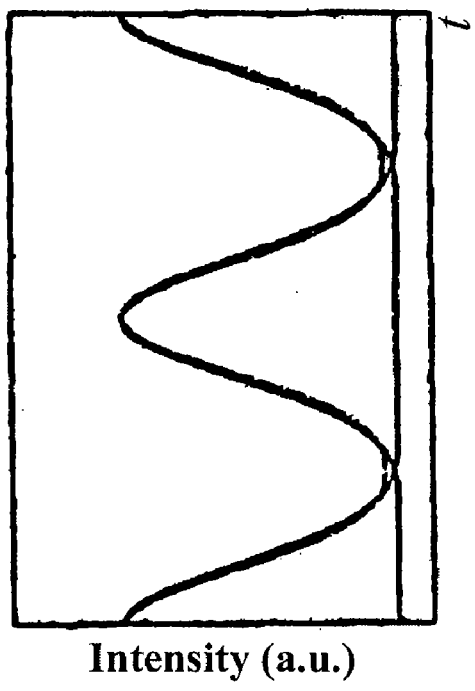
Figure 12A:
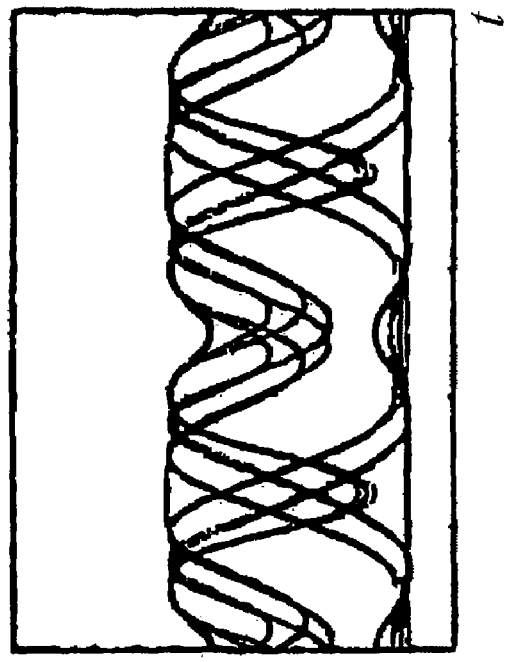
Figure 12B:
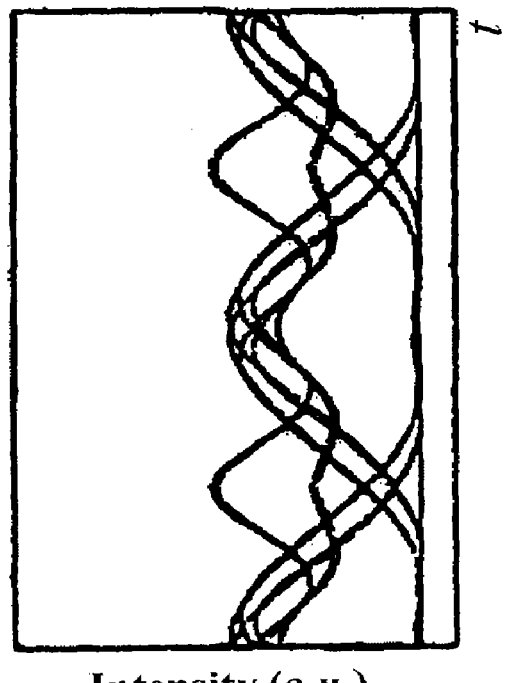
Figure 13B:
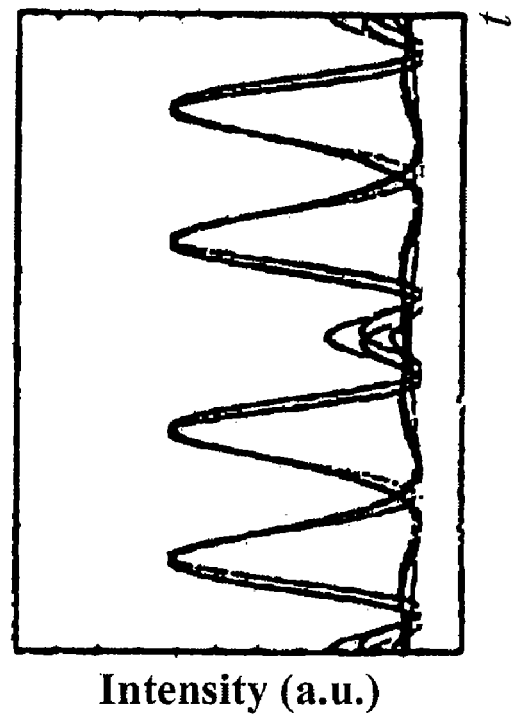
Figure 13A:
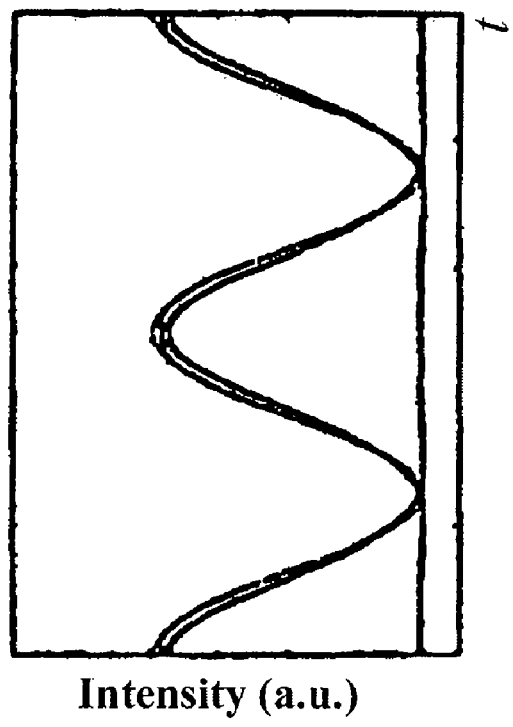
Figure 14B:
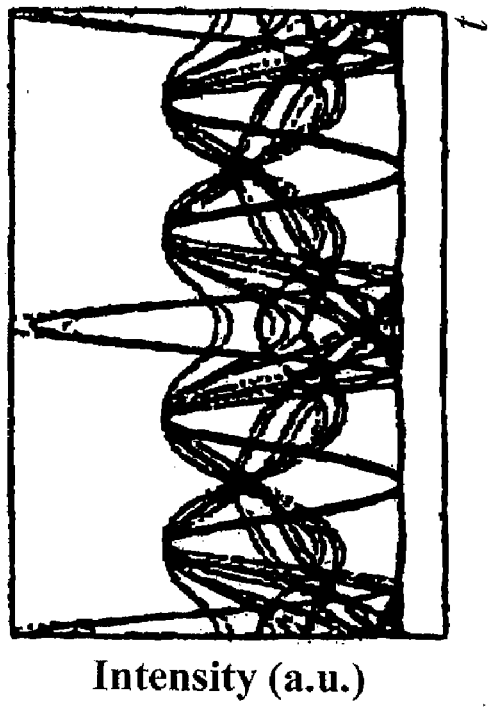
Figure 14A:
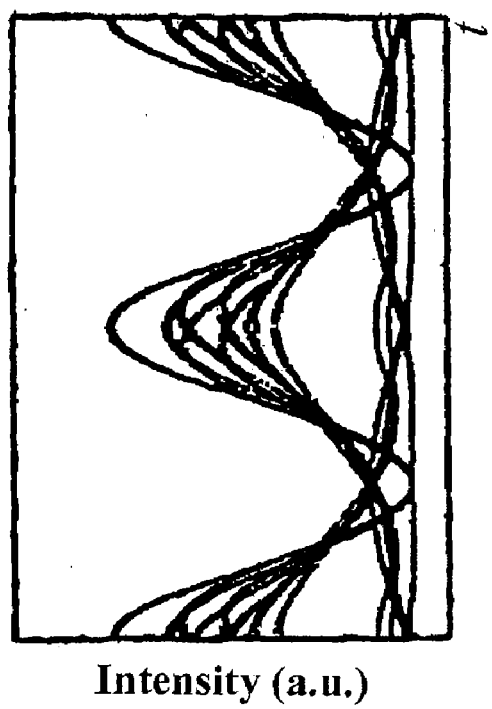

FIGS. 11A, 11B, 12A, 12B, 13A, 13B, 14A, and 14B are graphs showing simulation results of an optical waveform of an optical signal and an optical waveform of output light in the signal-quality evaluation device 200. FIGS. 11A and 11B correspond to an RZ signal format with a cumulative dispersion of 0 ps/nm. FIGS. 12A and 12B correspond to an RZ signal format with a cumulative dispersion of 40 ps/nm. FIGS. 13A and 13B correspond to a CSRZ signal format with a cumulative dispersion of 0 ps/nm. FIGS. 14A and 14B correspond to a CSRZ signal format with a cumulative dispersion of 60 ps/nm. Referring to these diagrams, in the case where the cumulative dispersion is 40 to 100 ps/nm and the optical signal has waveform distortion (FIGS. 12B, 14B), the depression at the 0-level of an output-light waveform is smaller as compared with the case of an output-light waveform where the cumulative dispersion is 0 ps/nm and the optical signal has no waveform distortion (FIGS. 11B, 13B).

Figure 15:
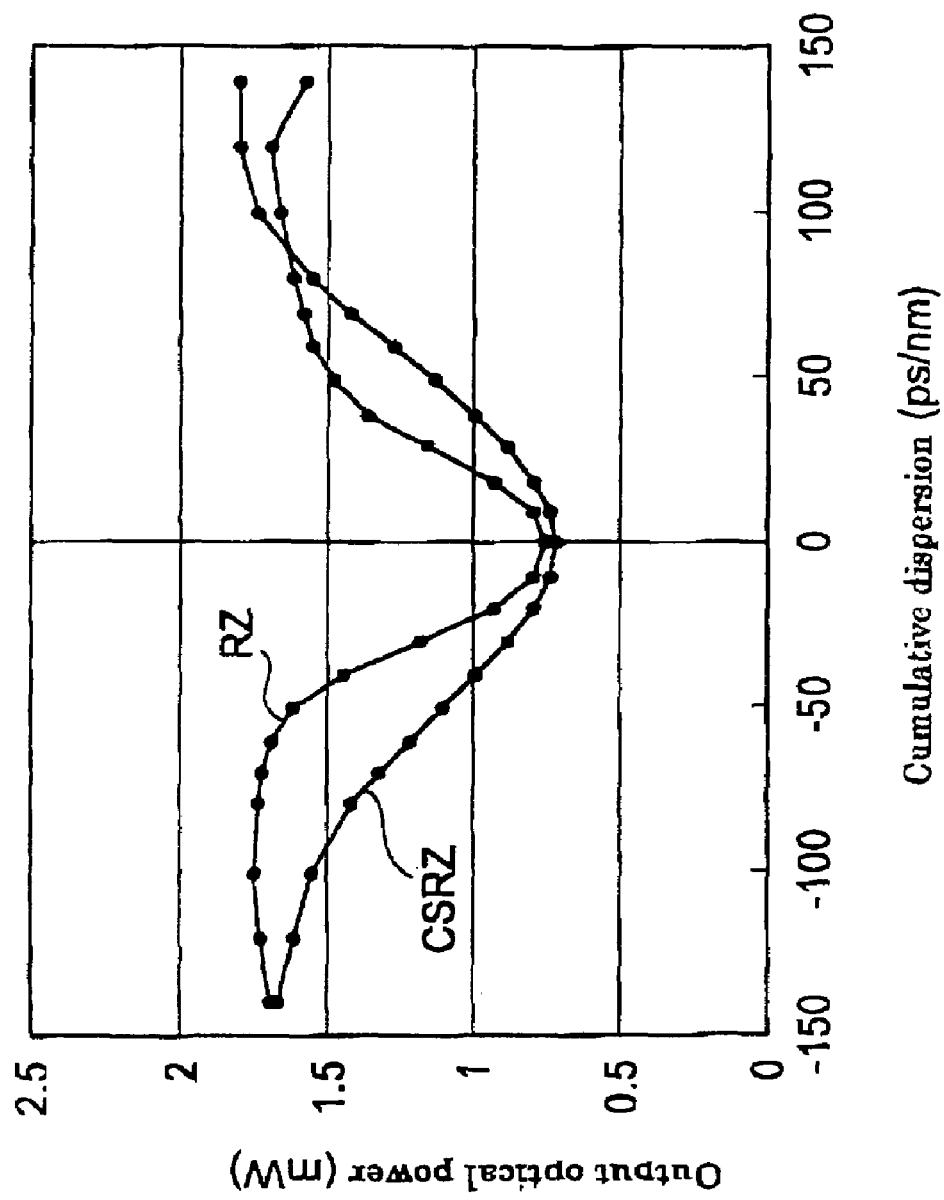
FIG. 15 is a graph that shows simulation results of a relationship between cumulative dispersion and output optical power in the signal-quality evaluation device 200.
Figure 16:
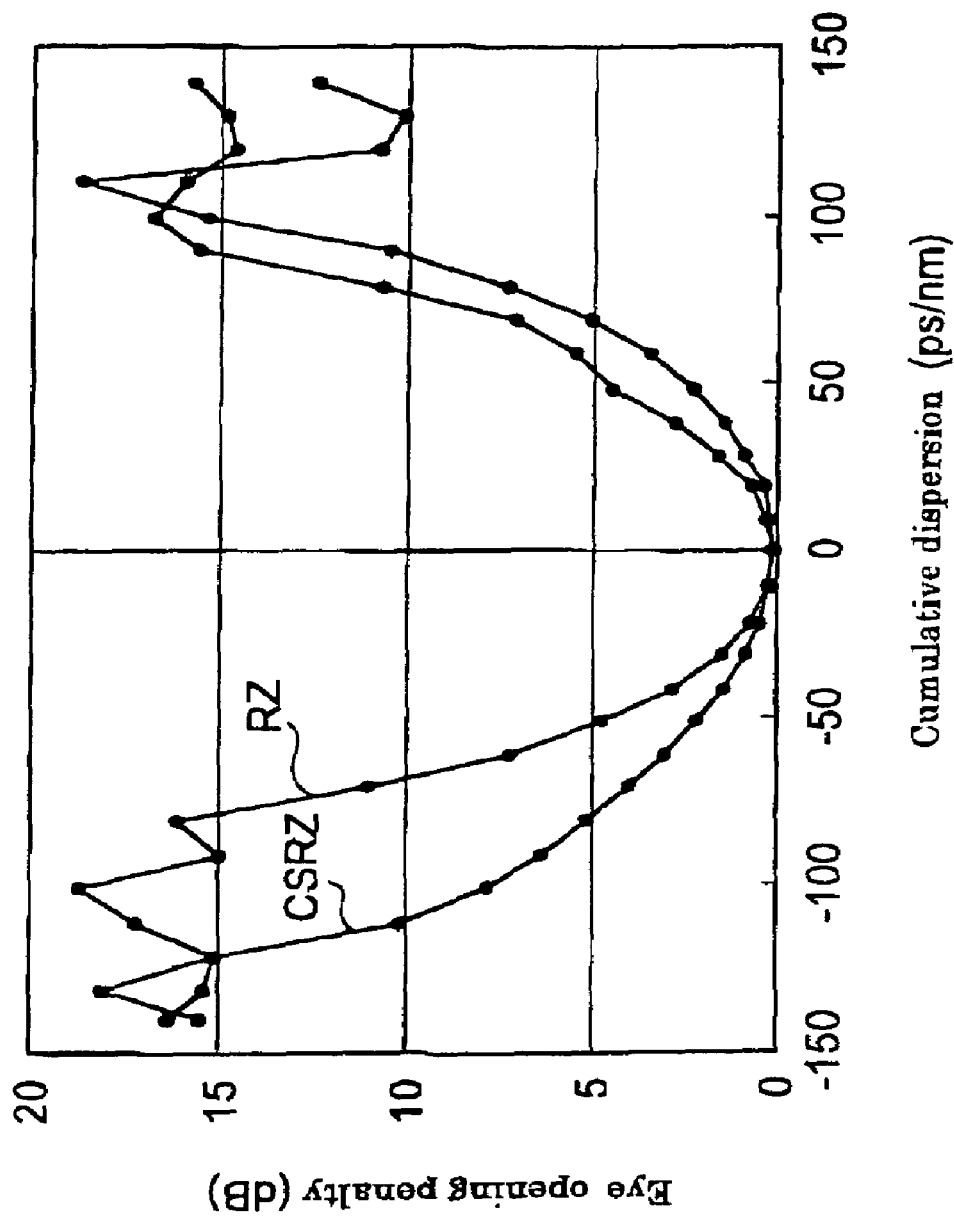
FIG. 16 is a graph showing a relationship between cumulative dispersion and eye opening penalty in the signal-quality evaluation device 200.

FIG. 15 is a graph that shows simulation results of a relationship between cumulative dispersion and output optical power in the signal-quality evaluation device 200. FIG. 16 is a graph showing a relationship between cumulative dispersion and eye opening penalty in the signal-quality evaluation device 200. Referring to these graphs, for each of the signal formats, when the cumulative dispersion is near zero, the output optical power $P_{out}$ in the signal-quality evaluation device 200 is minimum and the eye opening penalty is also minimum. The two show substantially the same pattern. In comparison to the eye-opening penalty, the output optical power $P_{out}$ in the signal-quality evaluation device 200 changes sensitively with respect to a change in cumulative dispersion within a range in which an absolute value of the cumulative dispersion is small.

Even though it is important for the signal-quality evaluation device 200 to precisely indicate the quality of an optical signal, the signal-quality evaluation device 200 is sufficiently advantageous by having a capability to properly evaluate the quality of an optical signal near a certain optimal point if it is to be used together with adjustment means (such as a variable dispersion compensator) that adjusts the quality of an optical signal. Therefore, the signal-quality evaluation device 200 may be used suitably for optical-signal evaluation.

Figure 17:
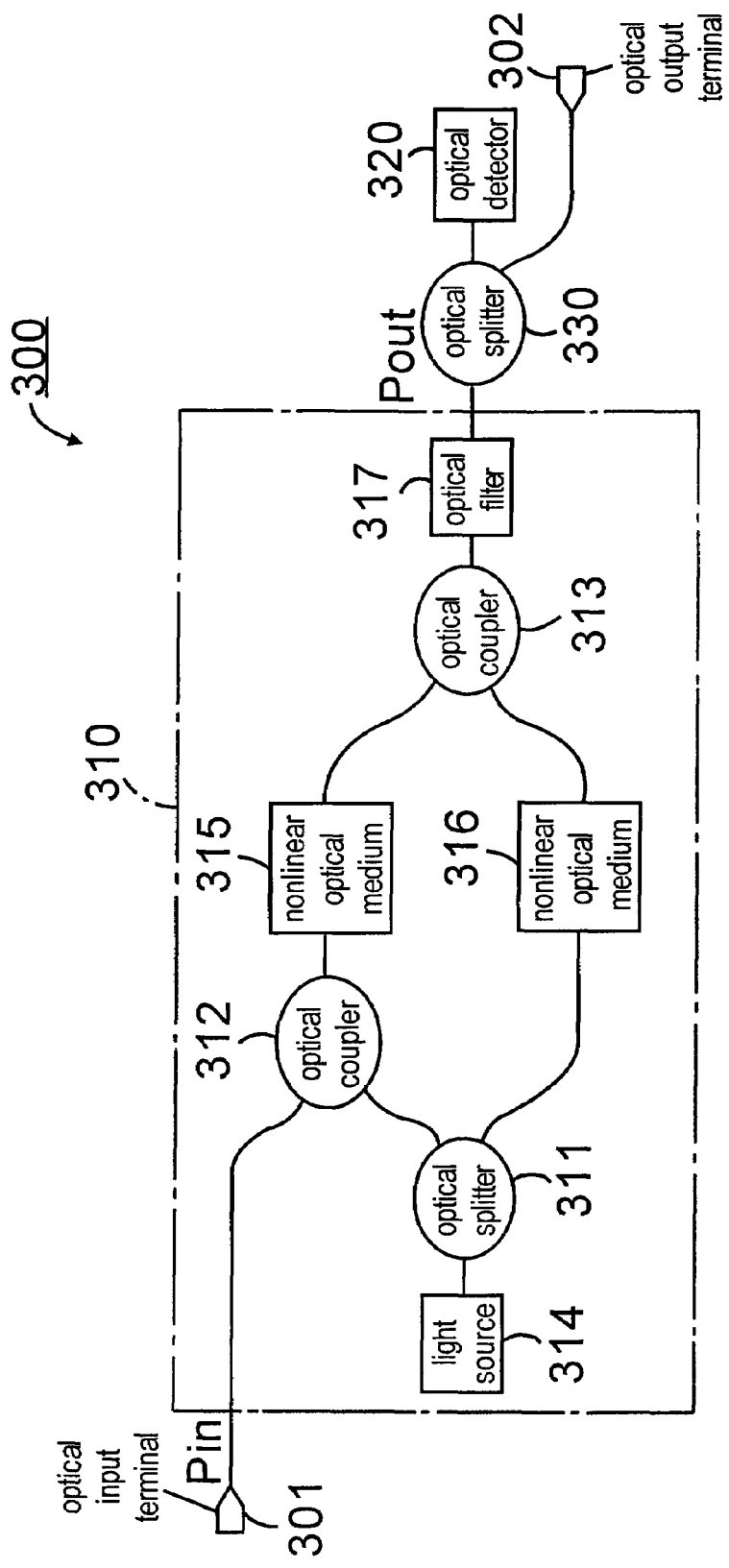
FIG. 17 schematically illustrates a signal-quality evaluation device 300 according to another specific example of the present invention.

FIG. 17 schematically illustrates a signal-quality evaluation device 300 according to another specific example of the present invention. The signal-quality evaluation device 300 includes an optical input terminal 301; an optical output terminal 302; an optical component 310; an optical detector 320; and an optical splitter 330. In the optical component 310, the output optical power $P_{out}$ is a function of the input optical power $P_{in}$, and this function $P_{out}(P_{in})$ has at least one maximum point. The optical detector 320 detects the time-average power of light output from the optical component 310.

The optical component 310 includes an optical splitter 311; an optical coupler 312; an optical coupler 313; a light source 314; a nonlinear optical medium 315; and a nonlinear optical medium 316. The light source 314 outputs unmodulated light having a wavelength different from the wavelength of an optical signal to be evaluated. The optical splitter 311 receives the unmodulated light from the light source 314 through an input terminal, splits the light, and then outputs the split light beams from a first output terminal and a second output terminal. The optical coupler 312 receives an input light beam from the input terminal 301 through a first input terminal, and also receives the light beam from the first output terminal of the optical splitter 311 through a second input terminal. The optical coupler 312 then outputs these light beams from an output terminal.

The nonlinear optical medium 315 outputs the light beams received from the output terminal of the optical coupler 312. The nonlinear optical medium 316 outputs the light beam received from the second output terminal of the optical splitter 311. A semiconductor optical amplifier, for example, is preferably used for each of the nonlinear optical medium 315 and the nonlinear optical medium 316. The nonlinear optical medium 316 may be omitted if unnecessary. The optical coupler 313 receives the light from the nonlinear optical medium 315 through a first input terminal and also receives the light from the nonlinear optical medium 316 through a second input terminal. The optical coupler 313 then guides these light beams towards an optical filter 317. The optical filter 317 extracts a light component having the same optical frequency as the unmodulated light, and outputs the light component. The optical splitter 330 receives the light output from the optical coupler 313, splits the light, and then outputs these split light beams towards the optical detector 320 and the optical output terminal 302.

In other words, the optical component 310 constitutes a Mach-Zehnder interferometer between the optical splitter 311 and the optical coupler 313. Of the two optical paths between the optical splitter 311 and the optical coupler 313, one optical path is provided with the nonlinear optical medium 315 and the other optical path is provided with the nonlinear optical medium 316. The nonlinear optical medium 315 receives an optical signal to be evaluated, and also receives the unmodulated light output from the light source 314. The nonlinear optical medium 316 receives the unmodulated light output from the light source 314.

According to the signal-quality evaluation device 300, cross-phase modulation is generated in the nonlinear optical medium 315 that receives the optical signal and the unmodulated light, such that the power of the optical signal is converted to phase rotation and is added to the unmodulated light. When the light output from the nonlinear optical medium 315 and the unmodulated light output from the nonlinear optical medium 316 are multiplexed by the optical coupler 313, an interference is generated in the process of multiplexing, whereby an output optical power $P_{out}$ corresponding to the input optical power $P_{in}$ is attained.

The power $P_{out}$ of the light output from the optical component 310 is expressed with Eq. (5):

$$P_{out} = \alpha P_{in} P_{cw} \{1 + \cos(\Delta\Phi(P_{in}))\} \quad (5).$$

In this case, $P_{cw}$ represents the power of the unmodulated light, and $\alpha$ represents a numerical constant set in view of loss. $\Delta\Phi$ represents a phase rotation amount under cross-phase modulation, and is a function of the input optical power $P_{in}$. Since $\Delta\Phi$ increases monotonously in response to an increase of the input optical power $P_{in}$, the output optical power $P_{out}$ is a function that increases and decreases periodically depending on the input optical power $P_{in}$ as a variable.

Optical-signal evaluation systems 10, 20 including the signal-quality evaluation device 101 according to embodiments of the present invention will now be described. These optical-signal evaluation systems 10, 20 are disposed at a certain position along an optical transmission line of an optical transmission system that transmits a digital optical signal through the optical transmission line. Consequently, the optical-signal evaluation system 10 or 20 evaluates the quality of an optical signal at its set position.

Figure 18:
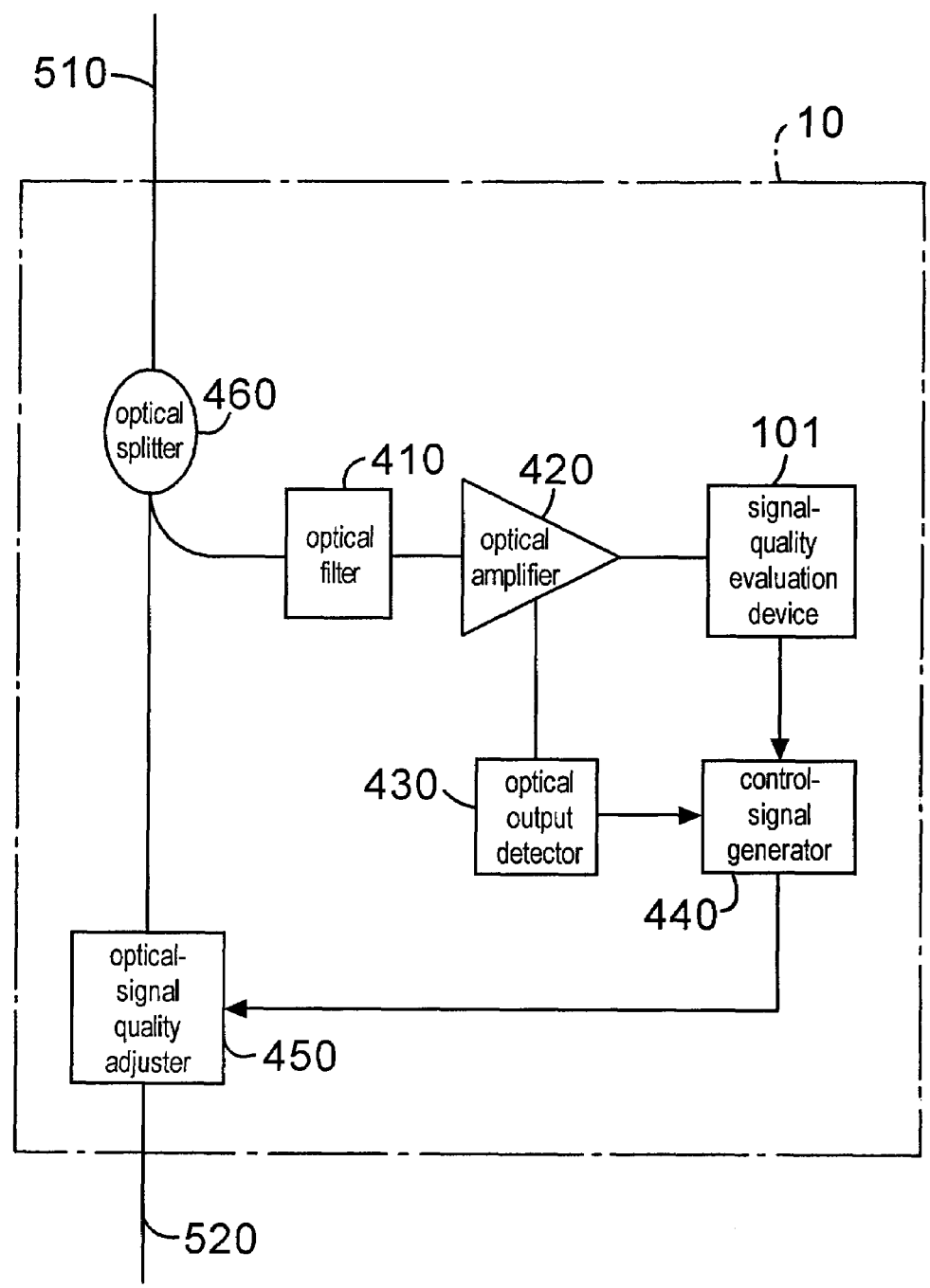
FIG. 18 is a block diagram illustrating an optical-signal evaluation system according to an embodiment of the present invention.
Figure 20:
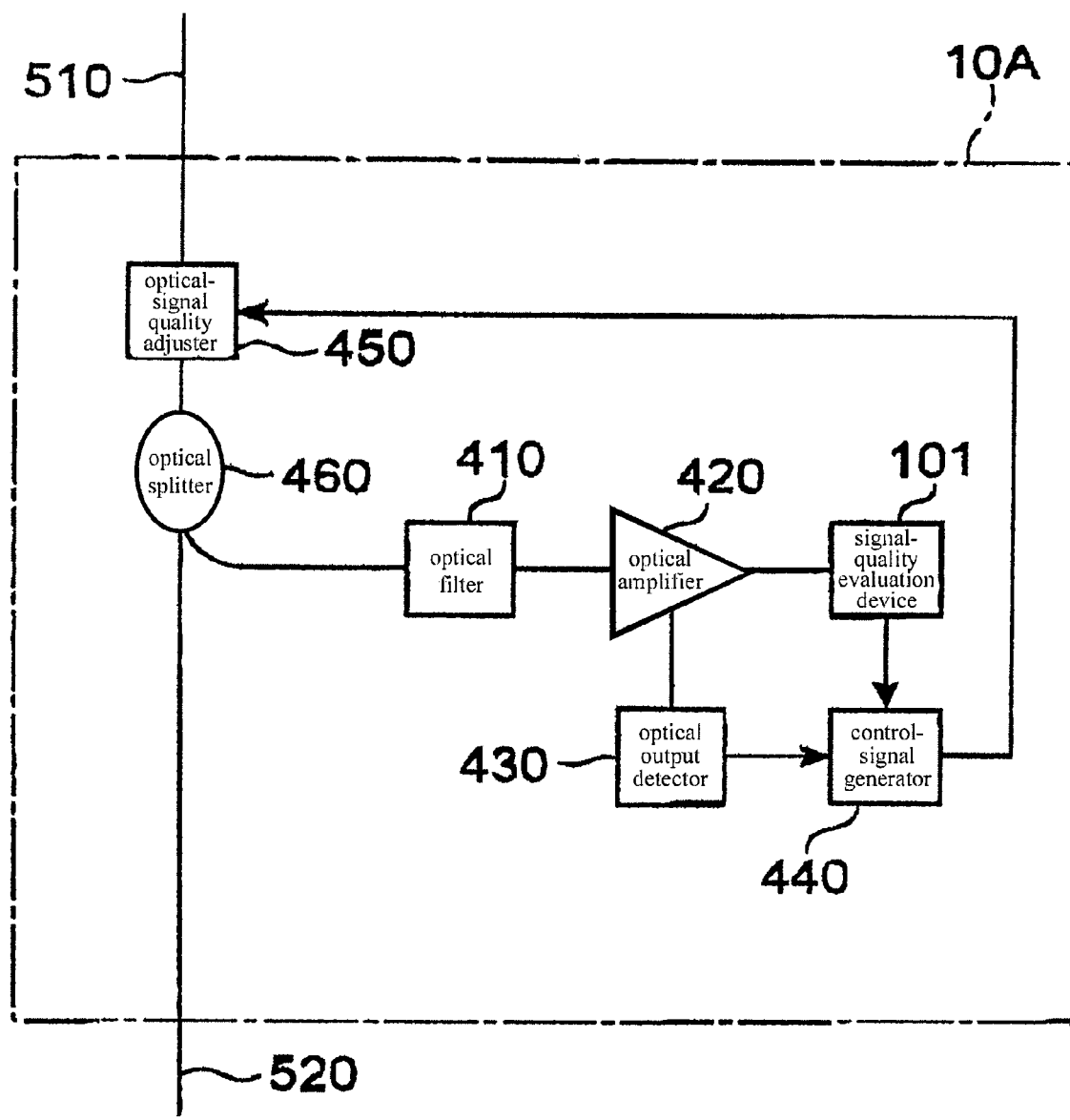
FIG. 20 is a block diagram illustrating an optical-signal evaluation system according to another embodiment of the present invention.

FIGS. 18 and 20 are block diagrams respectively illustrating optical-signal evaluation systems 10, 10A according to embodiments of the present invention. The optical-signal evaluation system 10 includes an optical filter 410, an optical amplifier 420, an optical output detector 430, a control-signal generator 440, an optical-signal quality adjuster 450, and an optical splitter 460. The control-signal generator 440 may be contained in the optical-signal quality adjuster 450.

The optical splitter 460 receives a digital optical signal transmitted through an optical transmission line 510, outputs a portion of the optical signal to the optical filter 410, and outputs the remaining portion to the optical-signal quality adjuster 450. The optical filter 410 receives the optical signal from the optical splitter 460 and selectively outputs a portion of the optical signal of a wavelength that is to be evaluated. The optical amplifier 420 receives the optical signal output from the optical filter 410, optically amplifies the 1-level of this optical signal to a predetermined power, and then outputs the optical signal. The predetermined power for the 1-level of the optical signal output from the optical amplifier 420 is a power level at which the signal-quality evaluation device 101 can evaluate the quality of the optical signal according to the above-described principle. The optical output detector 430 detects the input optical level and the output optical level in the optical amplifier 420.

The signal-quality evaluation device 101 receives the optical signal output from the optical amplifier 420, evaluates the quality of this optical signal, and then outputs a signal that indicates the evaluation result. Based on the optical-signal evaluation result by the signal-quality evaluation device 101 and the detection result of the input and output optical levels in the optical amplifier 420 by the optical output detector 430, the control-signal generator 440 outputs a control signal for controlling the optical-signal quality adjuster 450. The optical-signal quality adjuster 450 is controlled based on the control signal output from the control-signal generator 440, such that the quality of the optical signal transmitted from the optical splitter 460 is adjusted. This adjusted optical signal is then output to an optical transmission line 520.

The signal-quality evaluation device 200 or 300 may be used in place of the signal-quality evaluation device 101. Furthermore, the optical-signal quality adjuster 450 preferably reduces the absolute value of cumulative dispersion of the optical signal, or preferably reduces the polarization mode dispersion of the optical signal.

Figure 25:
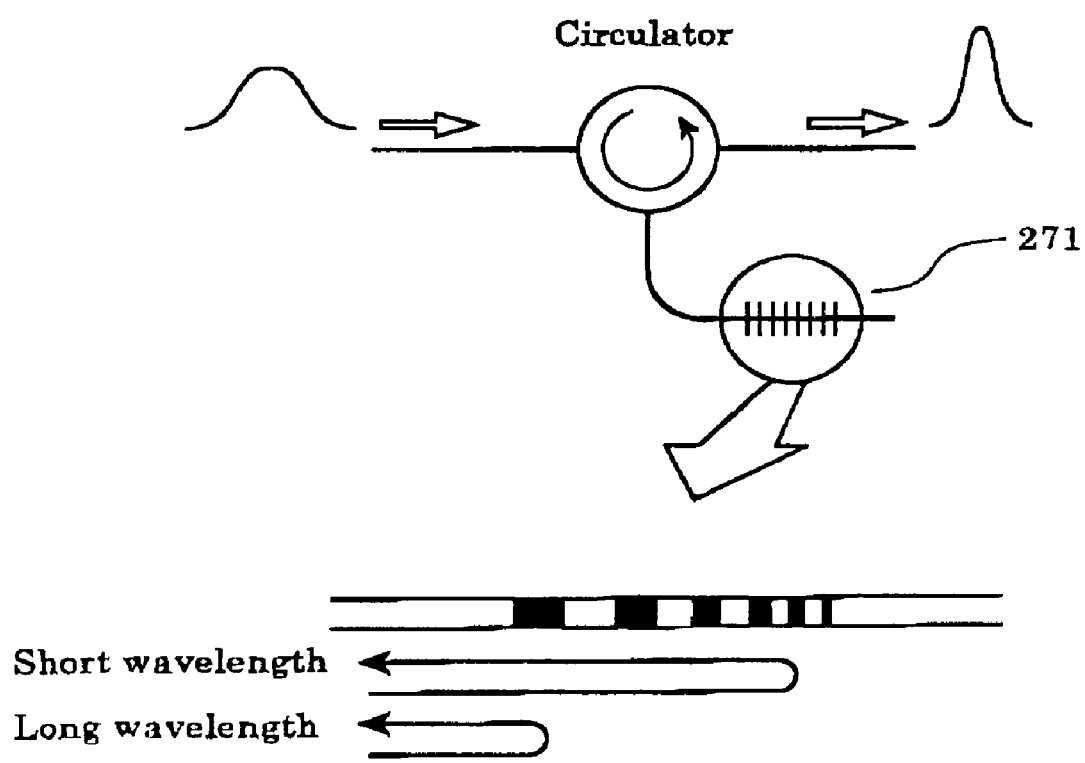
FIG. 25 schematically illustrates a dispersion adjustment means in which a fiber Bragg grating (FBG) is applied.
Figure 26:
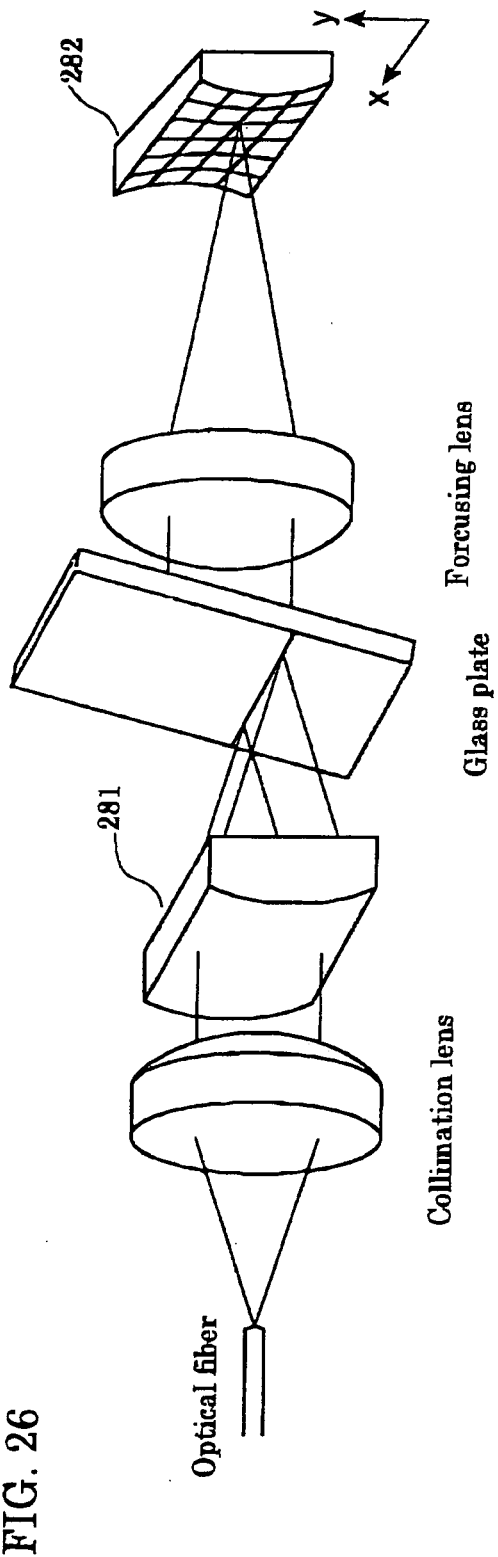
FIG. 26 schematically illustrates a concept of dispersion adjustment means in which a micro-electro-mechanical system (MEMS) is applied.

The following are examples of optical devices that perform dispersion adjustment. FIG. 25 schematically illustrates an example of dispersion adjustment means in which a fiber Bragg grating (FBG) is used. An FBG 271 (chirped-FBG) has different pitch widths in the longitudinal direction thereof, such that a reflecting position within the FBG can be displaced in accordance with the wavelength. With this structure of the FBG, dispersion can be afforded. The dispersion adjustment can be achieved by adjusting the distribution under the conditions where the FBG is afforded with an uneven temperature distribution or strain distribution. FIG.

26 schematically illustrates an example of dispersion adjustment means in which a micro-electro-mechanical system (MEMS) is used. In the MEMS, each wavelength component of a signal is dispersed by a lens 281 and made incident on a mirror 282 of the MEMS, which results in dispersion since optical-path differences are caused between the wavelength components due to a curvature of the mirror. The dispersion adjustment may be achieved by, for example, parallel-shifting a mirror having three-dimensional structure or by bending the mirror.

Figure 27:
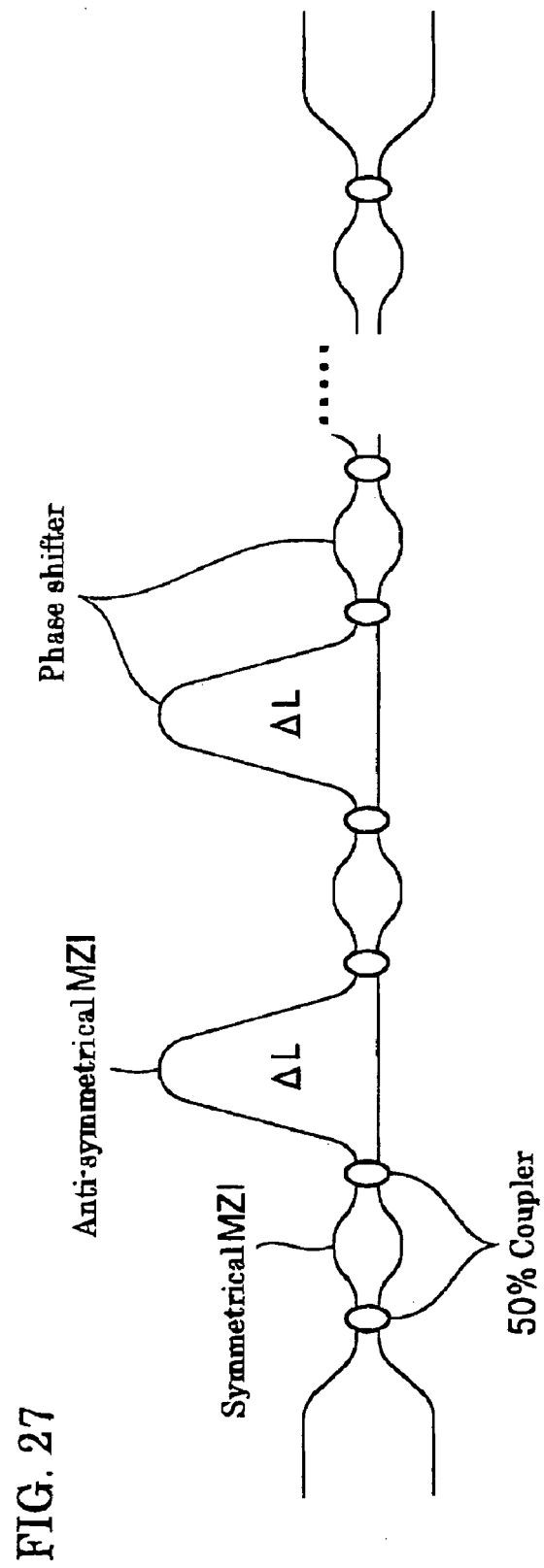
FIG. 27 schematically illustrates a concept of dispersion adjustment means in which a planar light-wave circuit (PLC) is applied.
Figure 28:
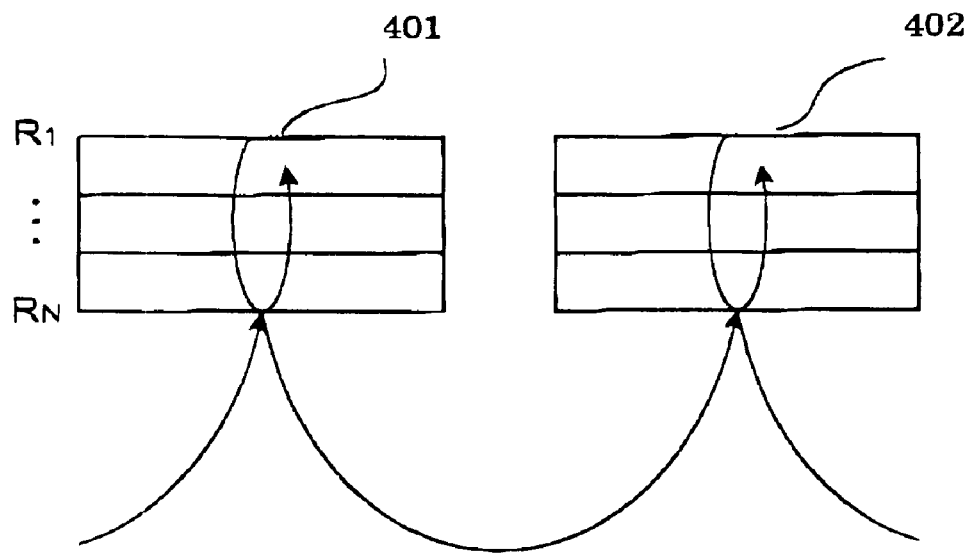
FIG. 28 schematically illustrates a concept of dispersion adjustment means in which etalons are used.
Figure 29:
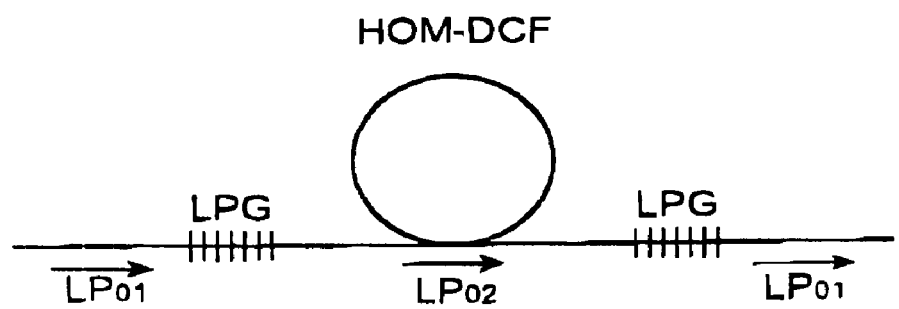
FIG. 29 schematically illustrates a concept of dispersion adjustment means in which a high-order-mode dispersion compensation fiber (DCF) is used.

FIG. 27 schematically illustrates an example of dispersion adjustment means in which a planar light-wave circuit (PLC) is used. The PLC includes a plurality of Mach-Zehnder interferometers. The dispersion adjustment is achieved by performing phase adjustment with a heater set on an arm of each interferometer. FIG. 28 schematically illustrates an example of dispersion adjustment means in which etalons are used. Etalons 401, 402 utilize the dispersion characteristics in a transmission range. The etalons 401, 402 have a double-step structure with which a compensation amount is changed by relatively shifting the transmission range from a state in which the dispersion is balanced out. FIG. 29 schematically illustrates an example of dispersion adjustment means in which a high-order-mode dispersion compensation fiber (HOM-DCF) is used. The HOM-DCF includes short HOM-DCF components connected in a multi-step fashion between which mode converters (such as gratings) are disposed. Accordingly, the dispersion compensation amount is adjusted in a step-like fashion by selecting a mode in each mode converter.

As for an optical device for adjusting polarization mode dispersion (PMD), a known device has polarization controllers between a plurality of polarization maintaining optical fibers (PMF), and pseudo-PMD can be created by adjusting the polarization controllers.

The optical-signal evaluation system 10 operates in the following manner. An optical signal transmitted through the optical transmission line 510 and input to the optical-signal evaluation system 10 is partially split by the optical splitter 460 in the optical-signal evaluation system 10. The split optical signal is optically amplified by the optical amplifier 420 to a predetermined power, and then enters the signal-quality evaluation device 101. The signal-quality evaluation device 101 evaluates the quality of the optical signal. The input level and the output level of optical signals in the optical amplifier 420 are detected by the optical output detector 430.

The result of optical-signal evaluation by the signal-quality evaluation device 101 and the results of detection of the input and output optical levels in the optical amplifier 420 by the optical output detector 430 are input to the control-signal generator 440. Based on the optical-signal evaluation result and the input-output-optical-level detection result, the control-signal generator 440 outputs a control signal for controlling the optical-signal quality adjuster 450. Based on the control signal output from the control-signal generator 440, the quality of the optical signal (e.g. chromatic dispersion and polarization mode dispersion) transmitted from the optical splitter 460 is adjusted by the optical-signal quality adjuster 450. The adjusted optical signal is then output to the optical transmission line 520. On the other hand, the optical-signal quality adjuster 450 may be disposed at a position of prior stage relative to the optical splitter 460 as in the case of the optical-signal evaluation system 10A shown in FIG. 20. This structure is favorable since it is possible to automatically optimize optical signals by loop control.

Figure 19:
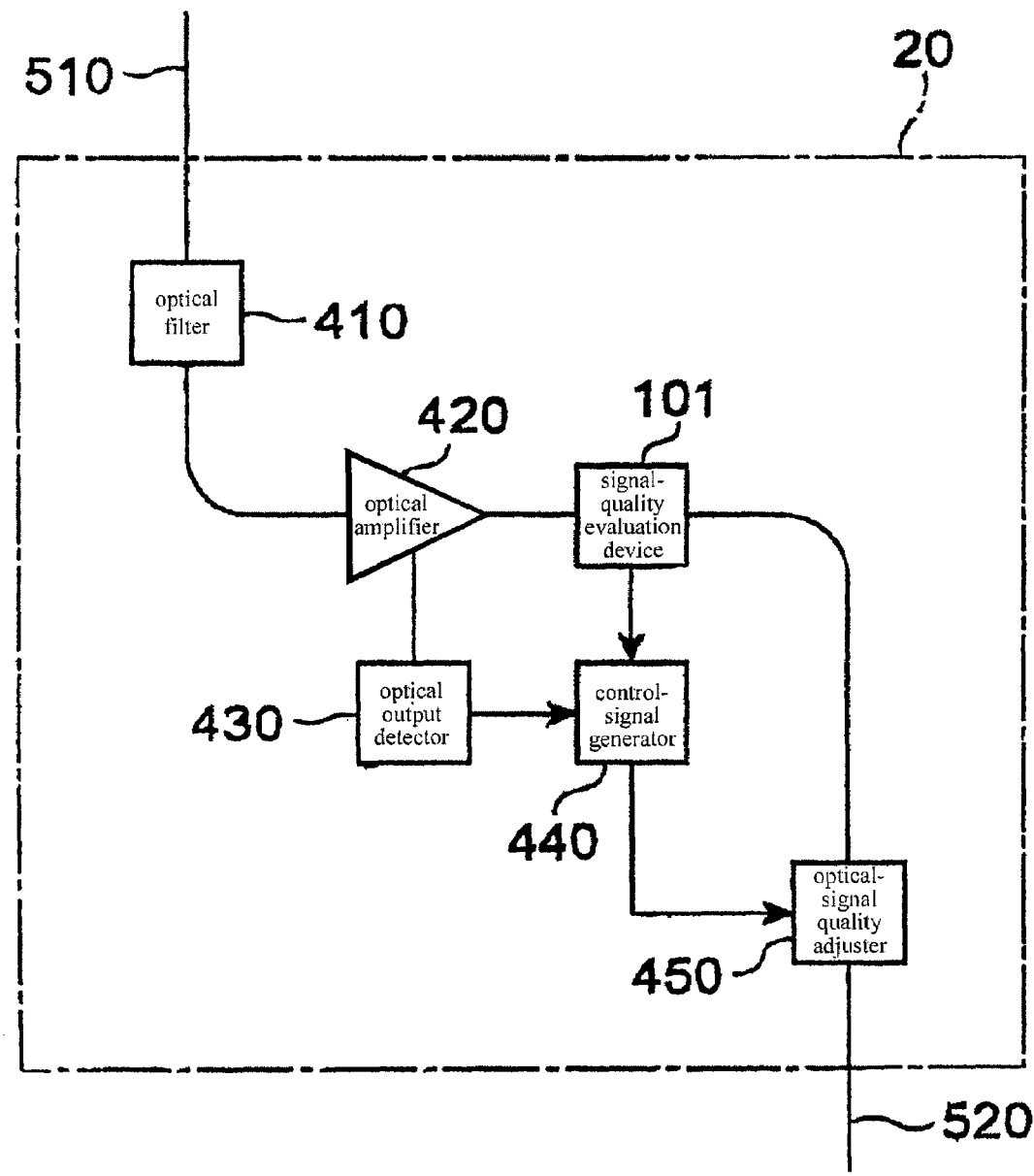
FIG. 19 is a block diagram illustrating an optical-signal evaluation system according to another embodiment of the present invention.
Figure 21:
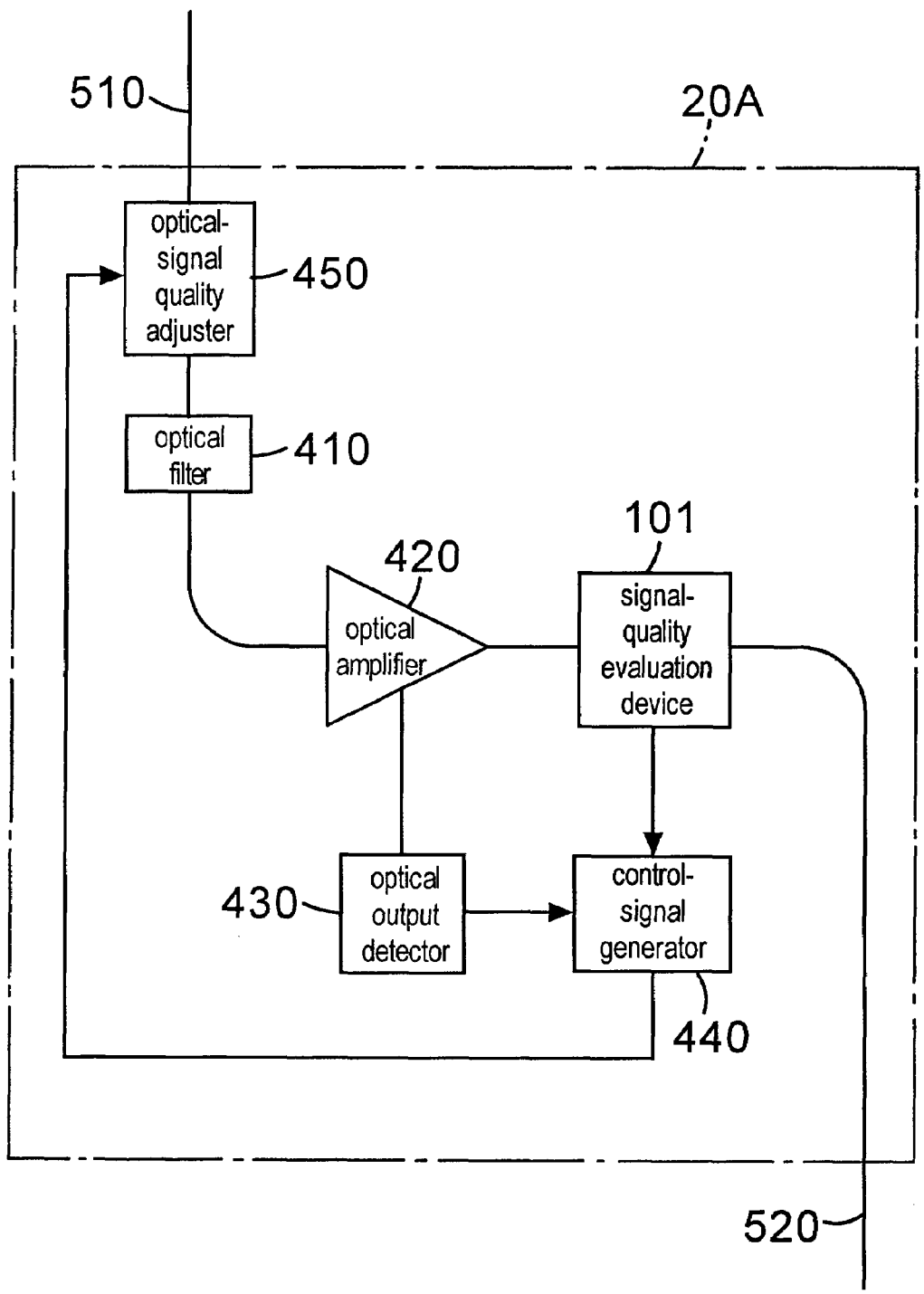
FIG. 21 is a block diagram illustrating an optical-signal evaluation system according to another embodiment of the present invention.

FIGS. 19 and 21 are block diagrams respectively illustrating optical-signal evaluation systems 20, 20A according to other embodiments of the present invention. The optical-signal evaluation system 20 includes the optical filter 410, the optical amplifier 420, the optical output detector 430, the control-signal generator 440, and the optical-signal quality adjuster 450. The optical filter 410 receives a digital optical signal transmitted through the optical transmission line 510 and selectively outputs a portion of the optical signal of a wavelength that is to be evaluated. The optical-signal quality adjuster 450 is controlled based on a control signal output from the control-signal generator 440, such that the optical-signal quality adjuster 450 adjusts the quality of the optical signal output from the signal-quality evaluation device 101. The adjusted optical signal is then output to the optical transmission line 520. Other configurations of the optical-signal evaluation system 20 are the same as in the optical-signal evaluation system 10.

The optical-signal evaluation system 20 operates in the following manner. An optical signal transmitted through the optical transmission line 510 and input to the optical-signal evaluation system 20 is optically amplified by the optical amplifier 420 to a predetermined power in the optical-signal evaluation system 10. The optical signal then enters the signal-quality evaluation device 101. The signal-quality evaluation device 101 evaluates the quality of the optical signal. Moreover, the input level and the output level of the optical signal in the optical amplifier 420 are detected by the optical output detector 430.

The optical-signal evaluation result by the signal-quality evaluation device 101 and the detection result of the input and output optical levels in the optical amplifier 420 by the optical output detector 430 are input to the control-signal generator 440. Based on the optical-signal evaluation result and the input-output-optical-level detection result, the control-signal generator 440 outputs a control signal for controlling the optical-signal quality adjuster 450. Based on the control signal output from the control-signal generator 440, the quality of the optical signal (e.g. chromatic dispersion and polarization mode dispersion) output from the signal-quality evaluation device 101 is adjusted by the optical-signal quality adjuster 450. The adjusted optical signal is then output to the optical transmission line 520. As in the optical-signal evaluation system 20A shown in FIG. 21, the optical-signal quality adjuster 450 may be disposed at a position of prior stage relative to the optical amplifier 420. This structure is favorable since it is possible to automatically optimize optical signals by loop control.

The optical-signal evaluation system 20 according to the embodiment of the present invention can not only evaluate the quality of optical signals but also perform waveform shaping of optical signals. In other words, the waveform of an optical signal is shaped in the signal-quality evaluation device 101 by setting the predetermined power for the 1-level of the optical signal output from the optical amplifier 420 to the input optical power $P_1$ or lower at which the output optical power $P_{out}$ becomes maximum as shown in FIG. 1B. Accordingly, amplified spontaneous emission (ASE) light generated in the optical amplifier 420 and the distortion of the optical signal can be compressed.

Each of the optical-signal evaluation systems 10, 20 respectively shown in FIGS. 18 and 19 includes, in addition to the signal-quality evaluation device 101, the optical-signal quality adjuster 450 for adjusting the quality of an optical signal (e.g. chromatic dispersion and polarization mode dispersion). Instead of the optical-signal quality adjuster 450, each of the optical-signal evaluation systems 10, 20 may be provided with an optical receiver for receiving an optical signal. With this structure, the quality of an optical signal entering the optical receiver can be evaluated by the signal-quality evaluation device 101 and an electrical signal output from the optical receiver that has received the optical signal can be processed flexibly based on the evaluation result.

Furthermore, each of the optical-signal evaluation systems 10, 20 may include both the optical-signal quality adjuster 450 and the optical receiver in addition to the signal-quality evaluation device 101. With this structure, the quality of an optical signal can be adjusted by the optical-signal quality adjuster 450 based on the result of evaluation by the signal-quality evaluation device 101, and the adjusted optical signal can then be received by the optical receiver.

Figure 22A:
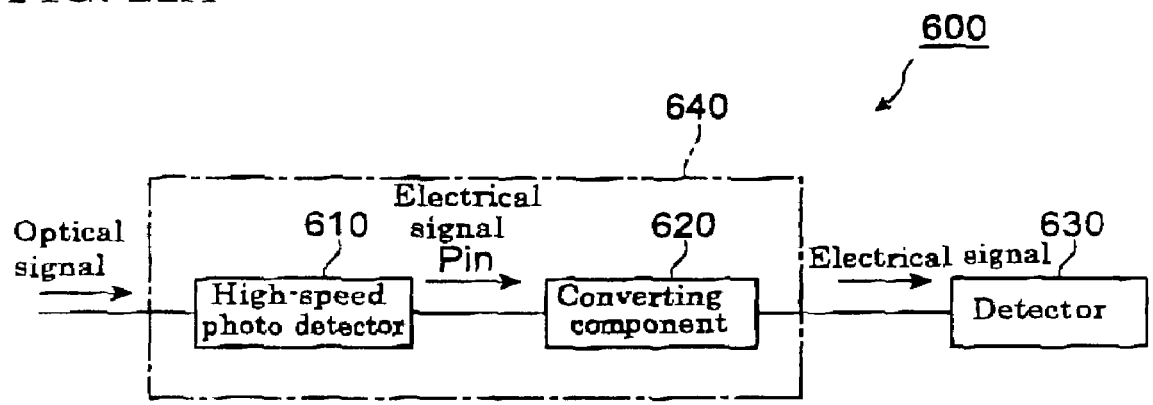
FIG. 22A is a block diagram illustrating a configuration of a signal-quality evaluation device according to another embodiment of the present invention.
Figure 22B:
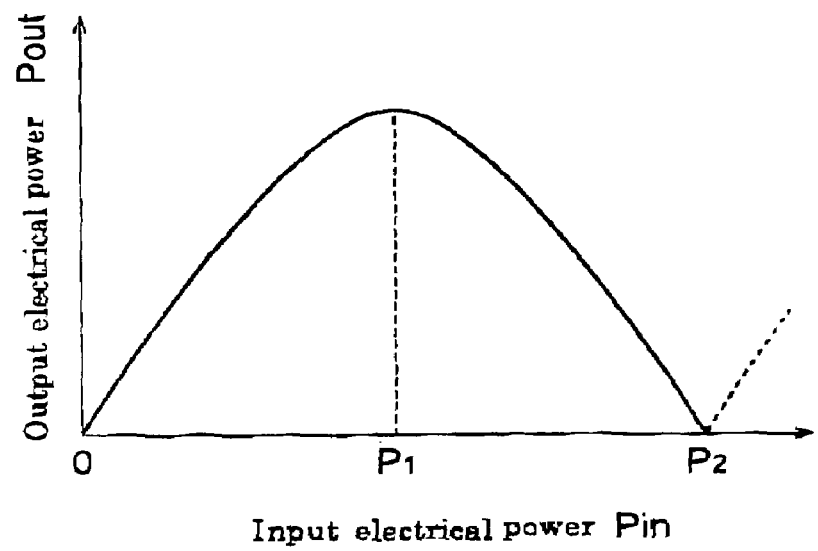
FIG. 22B is a graph illustrating input-output characteristics of an optical component included in the signal-quality evaluation device.

A signal-quality evaluation device and a signal adjustment method according to another embodiment of the present invention will now be described. FIG. 22A is a block diagram of a signal-quality evaluation device 600 according to another embodiment of the present invention. FIG. 22B is a graph illustrating input-output characteristics of an optical component included in the signal-quality evaluation device 600.

The signal-quality evaluation device 600 includes a high-speed photo detector 610, a converting component 620, and an output detector 630. The high-speed photo detector 610 includes, for example, a photodiode. Moreover, the high-speed photo detector 610 receives a digital optical signal and outputs an electric signal having amplitude that corresponds to the power of the input optical signal. The converting component 620 receives the electric signal output from the high-speed photo detector 610, and outputs an electric signal having a power $P_{out}$ that corresponds to the power $P_{in}$ of the input electric signal. As shown in FIG. 22B, in the converting component 620, the output power $P_{out}$ is a function of the input power $P_{in}$, and this function $P_{out}(P_{in})$ has at least one maximum point. The function $P_{out}(P_{in})$ may have a plurality of maximum points. The output detector 630 receives the electric signal output from the converting component 620 and detects the amplitude of a DC component of the input electric signal.

The signal-quality evaluation device 600 shown in FIG. 22 is different from the signal-quality evaluation device 100 shown in FIG. 1A in view of the following points. Specifically, in the signal-quality evaluation device 100, the component in which the function $P_{out}(P_{in})$ of input-output power has at least one maximum point is the optical component 110, and both input and output of the optical component 110 are optical signals. In contrast, in the signal-quality evaluation device 600, the component in which the function $P_{out}(P_{in})$ of input-output power has at least one maximum point is the converting component 620, and both input and output of the converting component 620 are electric signals.

Accordingly, in the signal-quality evaluation device 600, an optical signal is converted to an electric signal by the high-speed photo detector 610, and the electric signal output from the high-speed photo detector 610 is input to the converting component 620. The electric signal is then output from the converting component 620. Subsequently, the output detector 630 detects the amplitude of the DC component of the electric signal output from the converting component 620. Based on the detection result by the output detector 630, the quality of the optical signal input to the high-speed photo detector 610 can be evaluated. The signal-quality evaluation device 600 which includes the converting component 620 formed of an electric circuit and having the input-output electric signal characteristics is smaller as compared with the signal-quality evaluation device 100 that includes the optical component 110 having input-output optical-signal characteristics. The high-speed photo detector 610 and the converting component 620 may be integrated so as to constitute an optical-electrical converting component 640.

Optical-signal evaluation systems 30, 40 including the signal-quality evaluation device 600 according to embodiments of the present invention will now be described. These optical-signal evaluation systems 30, 40 are disposed at a certain position along an optical transmission line of an optical transmission system that transmits a digital optical signal through the optical transmission line. Consequently, the optical-signal evaluation system 30 or 40 evaluates the quality of an optical signal at its set position.

Figure 23:
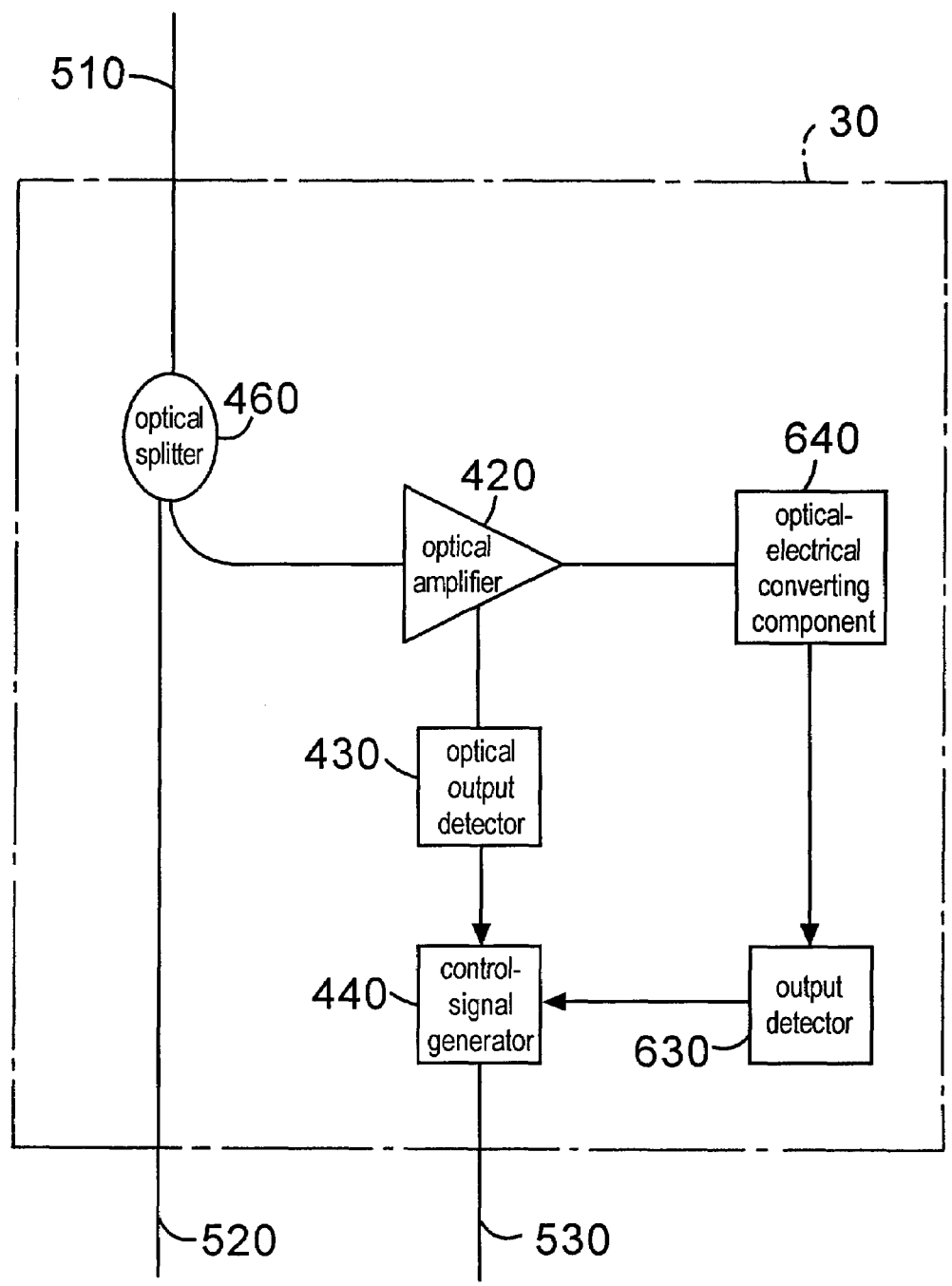
FIG. 23 is a block diagram of an optical-signal evaluation system according to an embodiment of the present invention.

FIG. 23 is a block diagram of the optical-signal evaluation system 30 according to an embodiment of the present invention. The optical-signal evaluation system 30 includes the optical amplifier 420, the optical output detector 430, the control-signal generator 440, the optical splitter 460, the optical-electrical converting component 640, and the output detector 630.

The optical splitter 460 receives a digital optical signal transmitted through the optical transmission line 510, outputs a portion of the optical signal to the optical amplifier 420, and outputs the remaining portion to the optical transmission line 520. The optical amplifier 420 receives the optical signal from the optical splitter 460, optically amplifies this optical signal, and then outputs this optical signal. The optical output detector 430 detects the input optical level and the output optical level regarding the optical amplifier 420.

The optical-electrical converting component 640 and the output detector 630 constitute the signal-quality evaluation device 600. The signal-quality evaluation device 600 receives the optical signal output from the optical amplifier 420, evaluates the quality of this optical signal, and outputs a signal indicating the evaluation result. Based on the optical-signal evaluation result by the signal-quality evaluation device 600 and the detection result of the input and output optical levels in the optical amplifier 420 by the optical output detector 430, the control-signal generator 440 generates a control signal for controlling an optical-signal quality adjuster (not shown), and outputs the control signal to a control line 530.

Figure 24:
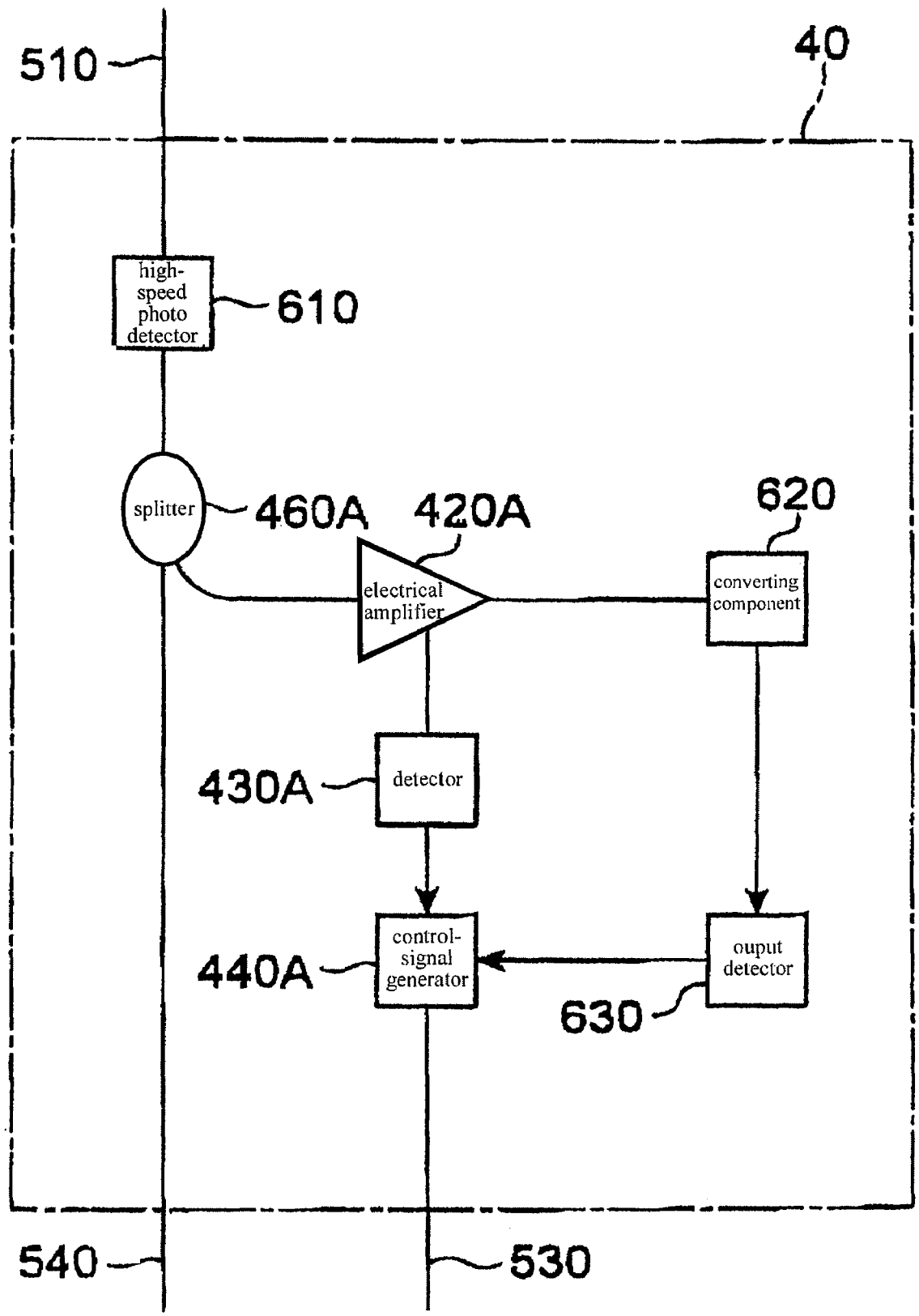
FIG. 24 is a block diagram of an optical-signal evaluation system according to another embodiment of the present invention.

FIG. 24 is a block diagram of the optical-signal evaluation system 40 according to another embodiment of the present invention. The optical-signal evaluation system 40 includes an electrical amplifier 420A, a detector 430A, a control-signal generator 440A, a splitter 460A, the high-speed photo detector 610, the converting component 620, and the output detector 630.

The high-speed photo detector 610 optically receives a digital optical signal transmitted through the optical transmission line 510 and outputs an electric signal having amplitude that corresponds to the power of the received optical signal. The splitter 460A receives the electric signal output from the high-speed photo detector 610 and outputs the electric signal to the electrical amplifier 420A and also to an output line 540 (such as a line connected to an interior of a receiver). The electrical amplifier 420A receives the electric signal from the splitter 460A, amplifies the electric signal, and then outputs the electric signal. The detector 430A detects the input electrical level and the output electrical level regarding the electrical amplifier 420A.

The high-speed photo detector 610, the converting component 620, and the output detector 630 constitute the signal-quality evaluation device 600. The signal-quality evaluation device 600 evaluates the quality of the optical signal and outputs a signal indicating the evaluation result. Based on the optical-signal evaluation result by the signal-quality evaluation device 600 and the detection result of the input and output electrical levels in the electrical amplifier 420A by the detector 430A, the control-signal generator 440A generates a control signal for controlling an optical-signal quality adjuster (not shown), and outputs the control signal to the control line 530.

The optical-signal evaluation system 40 may be provided together with, for example, a waveform shaper inside a receiver. An electric-signal adjuster, namely, an electronic dispersion compensator (EDC), may be disposed at a position of prior stage relative to the splitter 460A so that automatic dispersion compensation can be achieved inside the receiver. An EDC is an electric circuit having a plurality of multiplications and delays and has a function that widens an eye in an eye pattern by dynamically adjusting a coefficient. Currently, an EDC is commercially available in a form of a chip, and is attracting attention for its contribution to cost reduction in an optical transmission system.

The disclosure of Japanese Patent Application No. 2005-005512 (Application Date: Jan. 12, 2005) including the specification, claims, drawings, and abstract is entirely incorporated in this specification.

What is claimed is:

1. A signal-quality evaluation device comprising a converter and an output detector, wherein:

an output power $P_{out}$ of the converter has at least one maximum point with respect to an input power $P_{in}$ of a pulse of a digital signal, and the output detector detects an average output power corresponding to a plurality of output pulses converted from the digital signal by the converter and outputs output-power information, when $P_{in}$ is lower than an input power $P_1$ which corresponds to said at least one maximum point of $P_{out}$, $P_{out}$ increases with increase of $P_{in}$, when $P_{in}$ is higher than $P_1$, $P_{out}$ decreases with increase of $P_{in}$, the converter comprises an optical component, the converter includes an optical coupler and a nonlinear optical medium, and the optical coupler receives input light through a first terminal, splits the input light, and outputs the split light beams from a second terminal and a third terminal, and also inputs light through the second terminal and the third terminal and outputs light as the output light from the first terminal, and the nonlinear optical medium has an optical nonlinear effect and is disposed on an optical line extending between the second terminal and the third terminal of the optical coupler.

2. An optical-signal evaluation system comprising:

the signal-quality evaluation device according to claim 1 that outputs output-power information of a digital signal transmitted through an optical transmission line; and an amplifier that is disposed between the optical transmission line and the signal-quality evaluation device and that amplifies the digital signal, wherein the amplifier sends the digital signal to the signal-quality evaluation device, the digital signal having a pulse whose maximum power is greater than an input power level at the maximum point.

3. The optical-signal evaluation system according to claim 2, further comprising an optical-signal quality adjuster in which the quality of the digital signal as an optical signal is adjusted according to the output-power information output from the signal-quality evaluation device.

4. The optical-signal evaluation system according to claim 3, wherein the optical-signal quality adjuster includes cumulative-dispersion adjustment means for adjusting cumulative dispersion for the optical signal.

5. The optical-signal evaluation system according to claim 3, wherein the optical-signal quality adjuster includes polarization-mode-dispersion adjustment means for adjusting polarization mode dispersion for the optical signal.

6. The optical-signal evaluation system according to claim 2, wherein the signal-quality evaluation device is contained inside an optical receiver that receives the optical signal.

7. An optical transmission system that transmits an optical signal through an optical transmission line, wherein the optical transmission system is provided with the optical-signal evaluation system according to claim 2 disposed at an intermediate position on the optical transmission line.

* * * * *

UNITED STATES PATENT AND TRADEMARK OFFICE
CERTIFICATE OF CORRECTION

| | |
|---|---|
| PATENT NO. | : 7,643,759 B2 |
| APPLICATION NO. | : 11/330397 |
| DATED | : January 5, 2010 |
| INVENTOR(S) | : Masato Tanaka |

It is certified that error appears in the above-identified patent and that said Letters Patent is hereby corrected as shown below:

On the title page, insert the following:

--Related U.S. Application Data

(60) Provisional Application No. 60/659,904, filed March 10, 2005.--

Signed and Sealed this

Eighteenth Day of May, 2010

David J. Kappos
*Director of the United States Patent and Trademark Office*

UNITED STATES PATENT AND TRADEMARK OFFICE
CERTIFICATE OF CORRECTION

| | | |
|---|---|---|
| PATENT NO. | : 7,643,759 B2 | |
| APPLICATION NO. | : 11/330397 | |
| DATED | : January 5, 2010 | |
| INVENTOR(S) | : Masato Tanaka | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 807 days.

Signed and Sealed this

Twenty-first Day of December, 2010

David J. Kappos
*Director of the United States Patent and Trademark Office*